US012718982B2

(12) United States Patent
Higashiyama et al.

(10) Patent No.: US 12,718,982 B2
(45) Date of Patent: Aug. 25, 2026

(54) INDUCTOR COMPONENT

(71) Applicant: Murata Manufacturing Co., Ltd., Kyoto-fu (JP)

(72) Inventors: Tomomi Higashiyama, Nagaokakyo (JP); Keisuke Kunimori, Nagaokakyo (JP); Yuuki Kawakami, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 653 days.

(21) Appl. No.: 18/347,249

(22) Filed: Jul. 5, 2023

(65) Prior Publication Data

US 2024/0021363 A1 Jan. 18, 2024

(30) Foreign Application Priority Data

Jul. 15, 2022 (JP) ................................ 2022-114024

(51) Int. Cl.

| | |
|---|---|
| ***H01F 17/00*** | (2006.01) |
| ***H01F 27/29*** | (2006.01) |
| ***H01F 27/32*** | (2006.01) |
| ***H01F 41/04*** | (2006.01) |
| ***H01F 41/12*** | (2006.01) |

(52) U.S. Cl.

CPC ....... *H01F 41/041* (2013.01); *H01F 17/0013* (2013.01); *H01F 27/29* (2013.01); *H01F 27/324* (2013.01); *H01F 41/125* (2013.01)

(58) Field of Classification Search

CPC ......... H01F 27/2804; H01F 2027/2809; H01F 17/0006; H01F 17/0013; H01F 5/003; H01F 27/29; H01F 27/306; H01F 27/324; H01F 2017/0073

USPC .................................................. 336/200, 232

See application file for complete search history.

(56) References Cited

U.S. PATENT DOCUMENTS

| | | | | |
|---|---|---|---|---|
| 2020/0251273 A1* | 8/2020 | Takai | .................... | H01F 27/292 |
| 2021/0249189 A1* | 8/2021 | Mizobata | .............. | H01F 41/122 |
| 2021/0272733 A1* | 9/2021 | Hiraki | ................... | H01F 27/292 |
| 2021/0287842 A1* | 9/2021 | Hiraki | ................... | H01F 27/292 |
| 2023/0162899 A1* | 5/2023 | Imada | ................. | H01F 27/2847 336/199 |

FOREIGN PATENT DOCUMENTS

JP 2019-134141 A 8/2019

* cited by examiner

*Primary Examiner* — Tszfung J Chan

(74) *Attorney, Agent, or Firm* — Studebaker Brackett PLLC

(57) ABSTRACT

An inductor component includes a base body, an underlying insulation layer, an inductor wiring line, and a covering insulation layer. The underlying insulation layer is within the base body, and includes a first major face. The inductor wiring line is on the first major face within the base body, and extends along the first major face. The covering insulation layer is within the base body, and covers at least part of the inductor wiring line. The inductor wiring line includes a seed layer, and a plating layer in contact with the seed layer. As seen in a first cross-section orthogonal to a direction in which the inductor wiring line extends: the inductor wiring line includes first and second leg portions and a crotch portion. The first and second leg portions are in opposite end portions of a lower face of the inductor wiring line in a width direction.

20 Claims, 16 Drawing Sheets

INDUCTOR COMPONENT

CROSS-REFERENCE TO RELATED APPLICATION

This application claims benefit of priority to Japanese Patent Application No. 2022-114024, filed Jul. 15, 2022, the entire content of which is incorporated herein by reference.

BACKGROUND

Technical Field

The present disclosure relates to an inductor component.

Background Art

An exemplary inductor component in the related art is described in Japanese Unexamined Patent Application Publication No. 2019-134141. The inductor component includes a base body, an underlying insulation layer disposed within the base body, and an inductor wiring line located within the base body and disposed on a first major face of the underlying insulation layer.

SUMMARY

It has been found that the inductor component in the related art mentioned above still has room for improvement with regard to the strength of adhesion between the underlying insulation layer and the inductor wiring line. Insufficient adhesion between the underlying insulation layer and the inductor wiring line can potentially cause separation between the underlying insulation layer and the inductor wiring line.

Accordingly, the present disclosure provides an inductor component with a reduced risk of separation between an underlying insulation layer and an inductor wiring line.

An inductor component according to an aspect of the present disclosure includes a base body, an underlying insulation layer, an inductor wiring line, and a covering insulation layer. The underlying insulation layer is disposed within the base body, and includes a first major face. The inductor wiring line is disposed on the first major face within the base body, and extends along the first major face. The covering insulation layer is disposed within the base body, and covers at least part of the inductor wiring line. The inductor wiring line includes a seed layer, and a plating layer disposed in contact with the seed layer. As seen in a first cross-section orthogonal to a direction in which the inductor wiring line extends the inductor wiring line includes a first leg portion, a second leg portion, and a crotch portion. The first leg portion and the second leg portion are disposed in opposite end portions of a lower face of the inductor wiring line in a width direction. The lower face is a face near the first major face, the width direction is a direction parallel to the first major face. Also, the first leg portion and the second leg portion are embedded in the underlying insulation layer, and the crotch portion is disposed between the first leg portion and the second leg portion. The underlying insulation layer includes a projection. The projection is located between the first leg portion and the second leg portion and facing the crotch portion, and at least part of the seed layer is disposed at the crotch portion and in contact with an upper face of the projection.

As used herein, the term "inductor wiring line" means a curved line (two-dimensional curve) extending in a plane.

The inductor wiring line may be a curved line with a number of turns greater than one, or may be a curved line with a number of turns less than one. The inductor wiring line may partially include a straight-line portion.

A width direction refers to a direction parallel to the first major face as seen in the first cross-section. A width of an element as seen in the first cross-section refers to a length of the element in the width direction. A height direction refers to a direction orthogonal to the first major face as seen in the first cross-section. A height of an element as seen in the first cross-section refers to a length of the element in the height direction.

A direction such as upper or upward refers to a direction that, with respect to the direction orthogonal to the first major face, points from the underlying insulation layer toward the inductor wiring line (i.e., a direction away from the first major face). An upper face of an element refers to an upwardly located face of the element. A direction such as lower or downward refers to a direction that, with respect to the direction orthogonal to the first major face, points from the inductor wiring line toward the underlying insulation layer (i.e., a direction toward the first major face). A lower face of an element refers to a downwardly located face of the element.

According to the above-mentioned aspect, the inductor wiring line includes the first leg portion and the second leg portion that are embedded in the underlying insulation layer. This allows for anchoring of the first leg portion and the second leg portion to the underlying insulation layer. This in turn helps to improve the adhesion between the underlying insulation layer and the inductor wiring line, and consequently reduce the risk of separation between the underlying insulation layer and the inductor wiring line.

At least part of the seed layer is disposed at the crotch portion, and in contact with the upper face of the projection. Consequently, in forming the first leg portion and the second leg portion by plating, the plating is allowed to grow from the seed layer, which is in contact with the upper face of the projection, in a balanced manner on both the left and right sides of the seed layer in the width direction. As a result, the first leg portion and the second leg portion can be formed in a controlled, desired shape on both the left and right sides of the projection in the width direction. The ability to form the first leg portion and the second leg portion in a controlled shape allows for improved high-frequency characteristics of the inductor wiring line, in comparison to forming such leg portions in an uncontrolled shape with large variations in projections and recesses within the leg portions.

DETAILED DESCRIPTION

Figure 1:
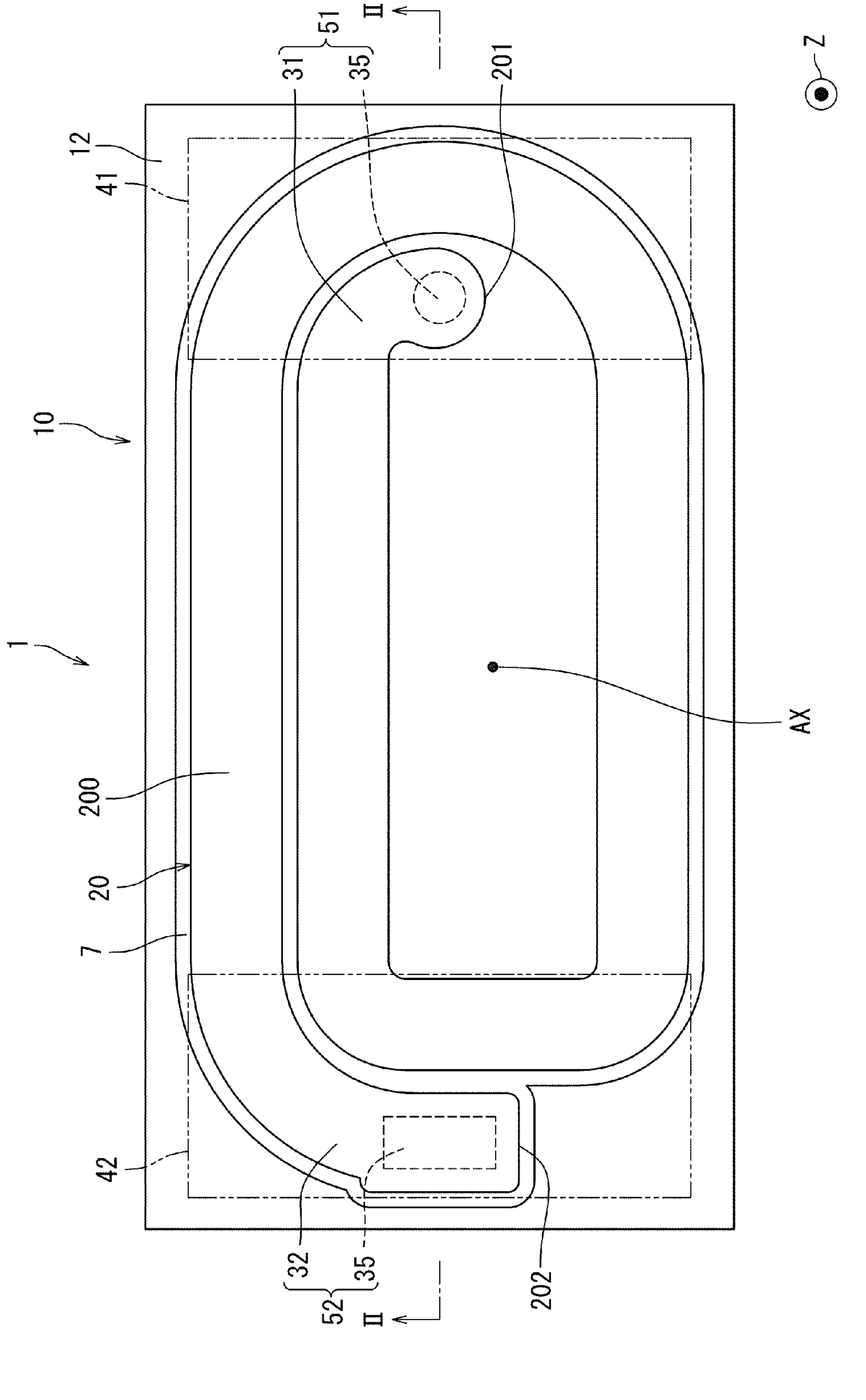
FIG. 1 is a see-through plan view of an inductor component according to a first embodiment.

An inductor component according to an aspect of the present disclosure is described below in more detail by way of its embodiments illustrated in the drawings. The drawings are partly schematic in nature and do not necessarily reflect the actual dimensions or ratios.

First Embodiment

Configuration

Figure 2:
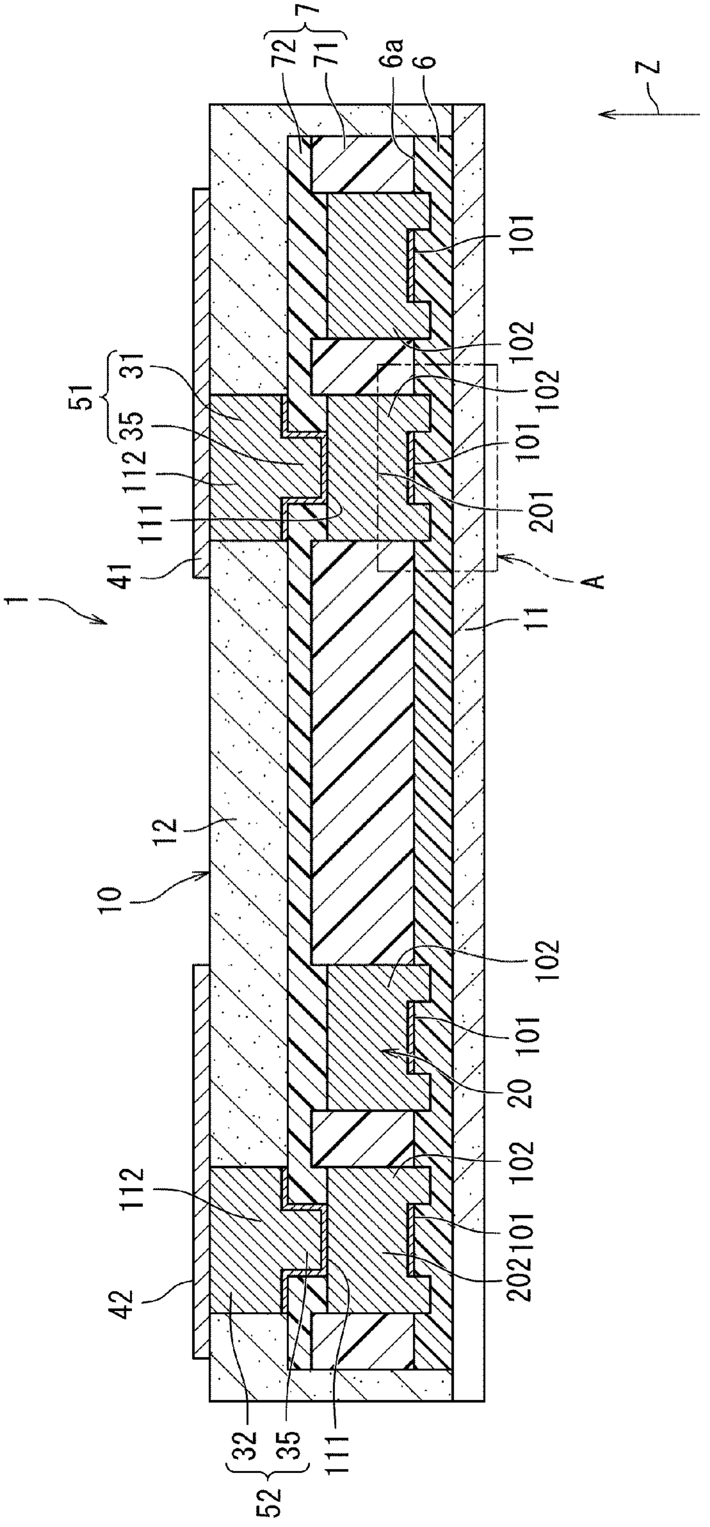
FIG. 2 illustrates a cross-section taken along II-II in FIG. 1.

FIG. 1 is a see-through plan view of an inductor component according to a first embodiment. FIG. 2 illustrates a cross-section taken along II-II in FIG. 1. FIG. 2 illustrates a cross-section including the center axis of a first vertical wiring line (via-wiring line) and the center axis of a second vertical wiring line (via-wiring line).

An inductor component 1 is incorporated in, for example, electronics such as personal computers, DVD players, digital cameras, TVs, mobile phones, and automotive electronics. The inductor component 1 has, for example, a generally cuboid shape. It is to be noted, however, that the shape of the inductor component 1 is not particularly limited but may be a circular cylinder, a polygonal prism, a circular truncated cone, or a polygonal frustum.

As illustrated in FIGS. 1 and 2, the inductor component 1 includes a base body 10, an underlying insulation layer 6, an inductor wiring line 20, a covering insulation layer 7, a first vertical wiring line 51, a second vertical wiring line 52, a first outer terminal 41, and a second outer terminal 42. In FIG. 1, the outer terminals are represented by chain double-dashed lines for convenience. Although the base body 10 and the covering insulation layer 7 are depicted in FIG. 1 as being transparent for the ease of understanding of their structures, these components may be translucent or non-transparent.

The base body 10 includes a first magnetic layer 11, and a second magnetic layer 12 disposed over the first magnetic layer 11. The first magnetic layer 11 and the second magnetic layer 12 are disposed in a first direction Z with the following components sandwiched therebetween: the underlying insulation layer 6, the inductor wiring line 20, and the covering insulation layer 7. That is, the underlying insulation layer 6, the inductor wiring line 20, and the covering insulation layer 7 are disposed within the base body 10. Although the base body 10 has a two-layer structure with the first magnetic layer 11 and the second magnetic layer 12, the base body 10 may have a three-layer structure with a substrate disposed between the first magnetic layer 11 and the second magnetic layer 12. In the following description, as illustrated in FIG. 2, the forward side (the upper side in FIG. 2) in the first direction Z is referred to as upper side, and the reverse side (the lower side in FIG. 2) in the first direction Z is referred to as lower side.

The first magnetic layer 11 and the second magnetic layer 12 each include a resin, and a metal magnetic powder serving as a magnetic substance contained in the resin. Consequently, as compared with a magnetic layer made of ferrite, the metal magnetic powder allows for improved direct-current superposition characteristics, and the resin provides insulation between metal magnetic powder particles. This helps to reduce loss (iron loss) at high frequencies.

An example of the resin is an epoxy-based resin, a polyimide-based resin, a phenol-based resin, or a vinyl ether-based resin. This configuration improves the reliability of insulation. More specifically, the resin is an epoxy resin, a mixture of epoxy and acrylic resins, or a mixture of epoxy, acrylic, and other resins. This ensures insulation between metal magnetic powder particles, and consequently allows for reduced loss (iron loss) at high frequencies.

The metal magnetic powder has a mean particle diameter of, for example, greater than or equal to 0.1 μm and less than or equal to 5 μm (i.e., from 0.1 μm to 5 μm). In the production stage for the inductor component 1, the mean particle diameter of the metal magnetic powder can be calculated as a particle diameter corresponding to the 50th percentile of the cumulative particle size distribution determined by the laser diffraction/scattering method. An example of the metal magnetic powder is an FeSi-based alloy such as FeSiCr, an FeCo-based alloy, an Fe-based alloy such as NiFe, or an amorphous alloy thereof. The metal magnetic powder is contained at a proportion of preferably greater than or equal to 20 vol % and less than or equal to 70 vol % (i.e., from 20 vol % to 70 vol %) of the whole magnetic layer. Use of a metal magnetic powder with a mean particle diameter of less than or equal to 5 μm allows for further improved direct-current superposition characteristics, and reduced iron loss at high frequencies due to the fine powder particle size. Use of a metal magnetic powder with a mean particle diameter of greater than or equal to 0. 1 μm facilitates uniform dispersion in the resin, leading to improved production efficiency for the first magnetic layer 11 and the second magnetic layer 12. Instead of or in addition to the metal magnetic powder, an NiZn- or MnZn-based ferrite magnetic powder may be used.

The underlying insulation layer 6 is disposed on the first magnetic layer 11. The underlying insulation layer 6 includes a first major face 6*a* opposite from the first magnetic layer 11. The underlying insulation layer 6 is made of an insulating material containing no magnetic substance, and includes, for example, one of the following resins: an epoxy-based resin, a phenol-based resin, a polyimide-based resin, an acrylic-based resin, and a vinyl ether-based resin. This configuration improves the reliability of insulation.

The inductor wiring line 20 is disposed on the first major face 6*a* of the underlying insulation layer 6, and extends along the first major face 6*a*. The inductor wiring line 20 is wound in a spiral around an axis AX on the first major face 6*a*. The axis AX is orthogonal to the first major face 6*a*. The inductor wiring line 20 has the shape of a spiral with more than one turn. As seen from above, the inductor wiring line 20 is wound clockwise in a spiral pattern from the outer circumferential end toward the inner circumferential end. The inductor wiring line 20 may be a curved line with less than one turn, or may partially include a straight-line portion.

The inductor wiring line 20 preferably has a thickness of, for example, greater than or equal to 30 μm and less than or equal to 120 μm (i.e., from 30 μm to 120 μm). In one exemplary implementation, the inductor wiring line 20 has a thickness of 45 μm, and a line width of 50 μm. The line-to-line spacing is 10 μm. The line-to-line spacing is preferably greater than or equal to 5 μm and less than or equal to 20 μm (i.e., from 5 μm to 20 μm).

The inductor wiring line 20 includes a spiral portion 200, a first pad portion 201, and a second pad portion 202. The first pad portion 201 is connected to the first vertical wiring line 51, and the second pad portion 202 is connected to the second vertical wiring line 52. The spiral portion 200 extends in a spiral pattern on the first major face 6*a* from the first pad portion 201 and the second pad portion 202, with the first pad portion 201 serving as the inner circumferential end and the second pad portion 202 serving as the outer circumferential end.

The inductor wiring line 20 includes a seed layer 101, and a plating layer 102 disposed in contact with the seed layer 101. The seed layer 101 is in contact with the first major face 6*a* of the underlying insulation layer 6, and formed by, for example, sputtering or other methods. The plating layer 102 is in contact with the seed layer 101, and formed by, for example, electroless plating. The inductor wiring line 20 is made of a conductive material. For example, the inductor wiring line 20 is made of a metallic material such as Cu, Ag, Au, Fe, or an alloy containing these metals. This allows for reduced direct-current resistance of the inductor component 1.

The covering insulation layer 7 covers at least part of the inductor wiring line 20. The covering insulation layer 7 includes a first insulation layer 71, and a second insulation layer 72. The first insulation layer 71 covers the side faces of the inductor wiring line 20, and the second insulation layer 72 covers the upper face of the inductor wiring line 20. More specifically, the first insulation layer 71 is located in the same plane as the inductor wiring line 20, and disposed in locations such as between turns of the inductor wiring line 20 and near the radially outer and inner portions of the inductor wiring line 20. The second insulation layer 72 covers the respective upper faces of the first insulation layer 71 and the inductor wiring line 20. The second insulation layer 72 has a hole at a location corresponding to each of the pad portions 201 and 202 of the inductor wiring line 20. Although the covering insulation layer 7 is described above as being made up of two insulation layers 71 and 72, the covering insulation layer 7 may be made up of one insulation layer or of three or more insulation layers.

The first insulation layer 71 and the second insulation layer 72 are made of an insulating material containing no magnetic substance, and includes, for example, one of the following resins: an epoxy-based resin, a phenol-based resin, a polyimide-based resin, an acrylic-based resin, and a vinyl ether-based resin. This configuration improves the reliability of insulation.

The first vertical wiring line 51 and the second vertical wiring line 52 extend in the first direction Z from the inductor wiring line 20, and penetrate the base body 10. The first vertical wiring line 51 includes a via-wiring line 35, and a first columnar wiring line 31. The via-wiring line 35 extends upward from the upper face of the first pad portion 201 of the inductor wiring line 20, and penetrates the interior of the covering insulation layer 7 (second insulation layer 72). The first columnar wiring line 31 extends upward from the via-wiring line 35, and penetrates the interior of the second magnetic layer 12. The second vertical wiring line 52 includes the via-wiring line 35, and a second columnar wiring line 32. The via-wiring line 35 extends upward from the upper face of the second pad portion 202 of the inductor wiring line 20, and penetrates the interior of the covering insulation layer 7 (second insulation layer 72). The second columnar wiring line 32 extends upward from the via-wiring line 35, and penetrates the interior of the second magnetic layer 12.

The first vertical wiring line 51 and the second vertical wiring line 52 each include a seed layer 111, and a plating layer 112 disposed in contact with the seed layer 111. The seed layer 111 is in contact with the inductor wiring line 20 and the covering insulation layer 7 (second insulation layer 72), and formed by, for example, sputtering or other methods. The plating layer 112 is in contact with the seed layer 111, and formed by, for example, electroless plating. The first vertical wiring line 51 and the second vertical wiring line 52 are made of a conductive material similar to that of the inductor wiring line 20.

The first outer terminal 41 is disposed on the upper face of the second magnetic layer 12, and covers an end face of the first columnar wiring line 31 that is exposed from the upper face of the second magnetic layer 12. The first outer terminal 41 is thus electrically connected with the first pad portion 201 of the inductor wiring line 20. The second outer terminal 42 is disposed on the upper face of the second magnetic layer 12, and covers an end face of the second columnar wiring line 32 that is exposed from the upper face of the second magnetic layer 12. The second outer terminal 42 is thus electrically connected with the second pad portion 202 of the inductor wiring line 20.

The first outer terminal 41 and the second outer terminal 42 are made of a conductive material. Each of the first outer terminal 41 and the second outer terminal 42 is of, for example, a three-layer structure with the following metallic layers disposed in the order stated below from an inner side portion toward an outer side portion: a metallic layer made of Cu with low electrical resistance and superior stress resistance; a metallic layer made of Ni with superior corrosion resistance; and a metallic layer made of Au with superior wettability and reliability.

Figure 3:
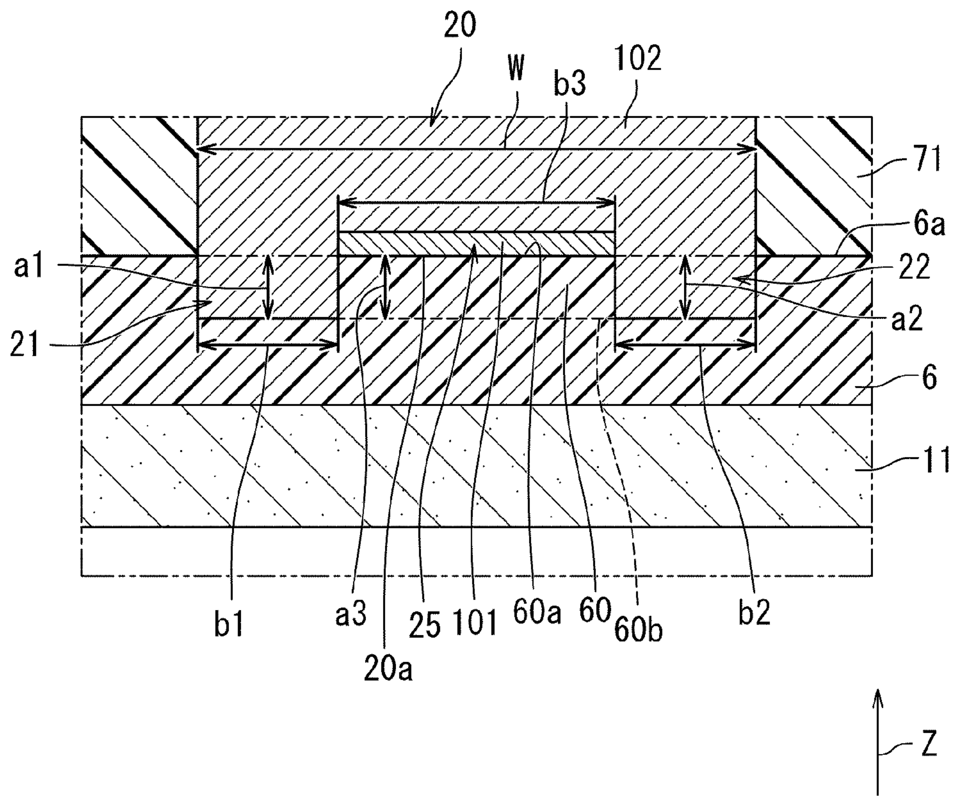
FIG. 3 is an enlarged view of a portion A illustrated in FIG. 2.

FIG. 3 is an enlarged view of a portion A illustrated in FIG. 2. FIG. 3 illustrates a first cross-section taken orthogonal to the direction in which the inductor wiring line 20 extends. As illustrated in FIG. 3, the inductor wiring line 20 includes a lower face 20*a* located near the first major face 6*a*. The lower face 20*a* of the inductor wiring line 20 includes a first leg portion 21, a second leg portion 22, and a crotch portion 25. The first leg portion 21 and the second leg portion 22 are respectively located in left and right end portions of the lower face 20*a* in the width direction. The first leg portion 21 and the second leg portion 22 are embedded in the underlying insulation layer 6. The crotch portion 25 is located between the first leg portion 21 and the second leg portion 22. The uppermost interface of each of the first leg portion 21 and the second leg portion 22 is located in the same plane as the first major face 6*a*, and represented by a dotted line in FIG. 3. The width direction refers to a direction parallel to the first major face 6*a* as seen in the first cross-section. As seen in plan view, the first leg portion 21 and the second leg portion 22 have a spiral shape that confirms to the spiral shape of the spiral portion 200.

The underlying insulation layer 6 includes a projection 60. The projection 60 is located between the first leg portion 21 and the second leg portion 22, and faces the crotch portion 25. The interface at a lowermost part 60*b* of the projection 60 is located in the same plane as the respective lower faces of the first leg portion 21 and the second leg portion 22, and represented by a dotted line in FIG. 3.

At least part of the seed layer 101 is disposed at the crotch portion 25, and in contact with an upper face 60*a* of the projection 60. More specifically, the entire seed layer 101 is disposed at the crotch portion 25, and constitutes the lower face of the crotch portion 25. The upper face 60*a* of the projection 60 is included in the first major face 6*a*.

According to the configuration mentioned above, the inductor wiring line 20 includes the first leg portion 21 and the second leg portion 22 that are embedded in the underlying insulation layer 6. This allows for anchoring of the first leg portion 21 and the second leg portion 22 to the underlying insulation layer 6. This in turn helps to improve the adhesion between the underlying insulation layer 6 and the inductor wiring line 20, and consequently reduce the risk of separation between the underlying insulation layer 6 and the inductor wiring line 20.

As described above, at least part of the seed layer 101 is disposed at the crotch portion 25, and in contact with the upper face 60*a* of the projection 60. Consequently, in forming the first leg portion 21 and the second leg portion 22 by plating, the plating is allowed to grow from the seed layer 101, which is in contact with the upper face 60*a* of the projection 60, in a balanced manner on both the left and right sides of the projection 60 in the width direction. As a result, the first leg portion 21 and the second leg portion 22 can be formed in a controlled, desired shape on both the left and right sides of the projection 60 in the width direction. The ability to form the first leg portion 21 and the second leg portion 22 in a controlled shape allows for improved high-frequency characteristics of the inductor wiring line 20, in comparison to forming these leg portions in an uncontrolled shape with large variations in projections and recesses within the leg portions.

As illustrated in FIG. 3, as seen in the first cross-section, the first leg portion 21 has a height a1 of preferably greater than or equal to 1 μm and less than or equal to 3 μm (i.e., from 1 μm to 3 μm). The height a1 of the first leg portion 21 refers to the maximum length of the first leg portion 21 in a direction orthogonal to the first major face 6*a* as seen in the first cross-section.

The configuration mentioned above helps to improve the adhesion between the underlying insulation layer 6 and the inductor wiring line 20, and ensure high-frequency characteristics of the inductor wiring line 20. That is, the height a1 of the first leg portion 21 is greater than or equal to 1 μm, which leads to improved anchoring of the first leg portion 21 to the underlying insulation layer 6, and consequently improved adhesion between the underlying insulation layer 6 and the inductor wiring line 20. Further, the height a1 of the first leg portion 21 is less than or equal to 3 μm. This helps to reduce the risk of insufficient plating growth in the first leg portion 21 when the first leg portion 21 is to be formed by plating. This also helps to limit the height of the first leg portion 21, and consequently ensure high-frequency characteristics of the inductor wiring line 20.

Preferably, the second leg portion 22 is similar in configuration to the first leg portion 21. That is, as seen in the first cross-section, the second leg portion 22 preferably has a height a2 of greater than or equal to 1 μm and less than or equal to 3 μm (i.e., from 1 μm to 3 μm). This helps to improve the adhesion between the underlying insulation layer 6 and the inductor wiring line 20, and ensure high-frequency characteristics of the inductor wiring line 20. The height a1 of the first leg portion 21, and the height a2 of the second leg portion 22 are the same. Alternatively, the height a1 of the first leg portion 21, and the height a2 of the second leg portion 22 may be different from each other.

As illustrated in FIG. 3, as seen in the first cross-section, the first leg portion 21 and the second leg portion 22 each have a rectangular shape. A rectangular shape in this case means a substantially rectangular shape, and may have slightly curved corners or edges. The first leg portion 21 has a width b1 that is the same as a width b2 of the second leg portion 22. The widths b1 and b2 refer to the maximum length of the first leg portion 21 in the direction parallel to the first major face 6*a*. The width b1 of the first leg portion 21, and the width b2 of the second leg portion 22 may be different from each other.

As illustrated in FIG. 3, as seen in the first cross-section, the projection 60 has a rectangular shape. A rectangular shape in this case means a substantially rectangular shape, and may have slightly curved corners or edges. The projection 60 has a height a3, and a width b3. In this case, the projection 60 has an aspect ratio of preferably greater than or equal to 0.02 and less than or equal to 0.3 (i.e., from 0.02 to 0.3), which is determined by dividing the height a3 by the width b3. The width b3 of the projection 60 refers to the maximum length of the projection 60 in the direction parallel to the first major face 6*a* as seen in the first cross-section. The height a3 of the projection 60 refers to the maximum length of the projection 60 in the direction orthogonal to the first major face 6*a* as seen in the first cross-section.

The configuration mentioned above allows the first leg portion 21 and the second leg portion 22 to be formed with improved reliability when the first leg portion 21 and the second leg portion 22 are to be formed by plating. This helps to improve the adhesion between the underlying insulation layer 6 and the inductor wiring line 20, and ensure high-frequency characteristics of the inductor wiring line 20.

That is, the aspect ratio is less than or equal to 0.3 as mentioned above. The seed layer 101, which is in contact with the upper face 60*a* of the projection 60, is thus allowed to have a comparatively large width. This helps to reduce the risk of insufficient plating growth in the first leg portion 21 and the second leg portion 22 when the first leg portion 21 and the second leg portion 22 are to be formed by plating. Further, the aspect ratio is greater than or equal to 0.02 as described above. This allows the first leg portion 21 and the second leg portion 22 to have a comparatively large height. This in turn leads to improved anchoring of the first leg portion 21 to the underlying insulation layer 6, and consequently improved adhesion between the underlying insulation layer 6 and the inductor wiring line 20. In this way, the first leg portion 21 and the second leg portion 22 can be formed with improved reliability.

As illustrated in FIG. 3, as seen in the first cross-section, the projection 60 has a rectangular shape. The width b3 of the projection 60 is preferably greater than or equal to 30% and less than or equal to 80% (i.e., from 30% to 80%) of a width W of the inductor wiring line 20. The width W of the inductor wiring line 20 refers to the maximum length of the inductor wiring line 20 in the direction parallel to the first major face 6*a* as seen in the first cross-section.

The configuration mentioned above allows the first leg portion 21 and the second leg portion 22 to be formed with improved reliability when the first leg portion 21 and the second leg portion 22 are to be formed by plating. This helps to improve the adhesion between the underlying insulation layer 6 and the inductor wiring line 20, and ensure high-frequency characteristics of the inductor wiring line 20.

That is, the width b3 is greater than or equal to 30% of the width W as mentioned above. The seed layer 101, which is in contact with the upper face 60*a* of the projection 60, is thus allowed to have a comparatively large width. This helps to reduce the risk of insufficient plating growth in the first leg portion 21 and the second leg portion 22 when the first leg portion 21 and the second leg portion 22 are to be formed by plating. Further, the width b3 is less than or equal to 80% of the width W as mentioned above. The first leg portion 21 and the second leg portion 22 are thus allowed to have a comparatively large width. This makes it possible to, in forming the first leg portion 21 and the second leg portion 22 by plating, reduce the risk of the plating easily entering the first leg portion 21 and the second leg portion 22 and thus creating a void. In this way, the first leg portion 21 and the second leg portion 22 can be formed with improved reliability.

Although the cross-sections of four inductor wiring lines 20 are depicted in FIG. 2, it may suffice that the cross-section of at least one of the four inductor wiring lines 20 satisfies the various features described above with reference to FIG. 3.

Production Method

A method for producing the inductor component 1 is described below with reference to FIGS. 4A to 4H. FIGS. 4A to 4H are illustrations corresponding to the first pad portion 201 of the inductor wiring line 20 illustrated in the FIG. 2 and to the first vertical wiring line 51 illustrated in the FIG. 2.

Figure 4A:
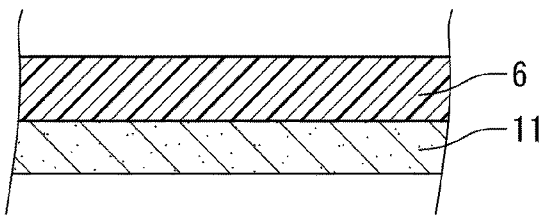
FIG. 4A is a schematic cross-sectional illustration for explaining a method for producing an inductor component.
Figure 4B:
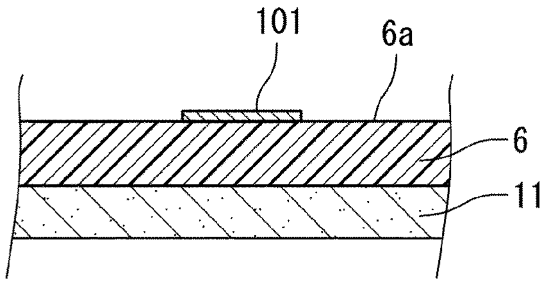
FIG. 4B is a schematic cross-sectional illustration for explaining a method for producing an inductor component.

As illustrated in FIG. 4A, the underlying insulation layer 6 is formed on the first magnetic layer 11. As the underlying insulation layer 6, for example, a polyimide-based resin is used. As illustrated in FIG. 4B, the seed layer 101 is formed on the first major face 6*a* of the underlying insulation layer 6. More specifically, a material for the seed layer 101 is deposited onto the first major face 6*a* by sputtering, and subjected to patterning by photolithography to thereby form the seed layer 101.

Figure 4C:
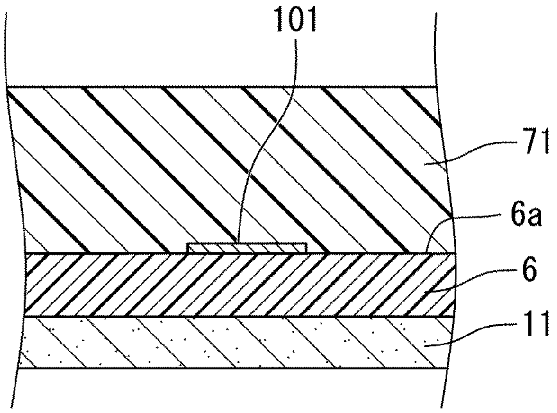
FIG. 4C is a schematic cross-sectional illustration for explaining a method for producing an inductor component.
Figure 4D:
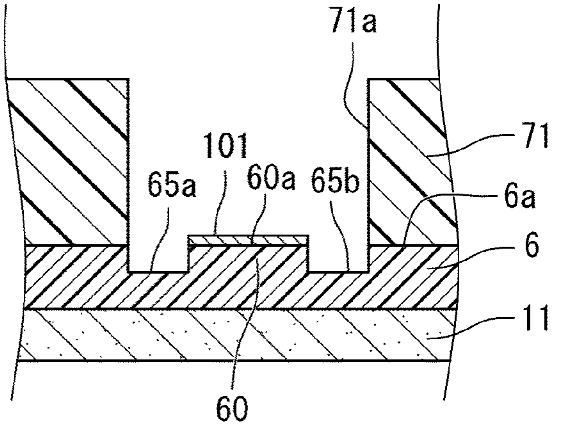
FIG. 4D is a schematic cross-sectional illustration for explaining a method for producing an inductor component.

As illustrated in FIG. 4C, the first insulation layer 71 is formed on the underlying insulation layer 6 so as to cover the seed layer 101. As the first insulation layer 71, for example, a photosensitive permanent film (permanent photoresist) is used. A photosensitive permanent film refers to a photoresist that is not removed after undergoing processing. More specifically, a material for the first insulation layer 71 is applied onto the underlying insulation layer 6, and then subjected to exposure. Then, as illustrated in FIG. 4D, developing is performed by use of an organic solvent such as propylene glycol monomethyl ether acetate (PGMEA), and an alkaline developer such as tetramethylammonium hydroxide (TMAH). This results in a cavity 71*a* being formed in the first insulation layer 71 at a location corresponding to the inductor wiring line 20.

During the developing, a portion of the underlying insulation layer 6 is etched away, and a first groove 65*a* and a second groove 65*b* are thus formed in the underlying insulation layer 6. If a polyimide-based resin with poor alkali resistance is used for the underlying insulation layer 6, this allows the portion of the underlying insulation layer 6 to be easily etched away. As a result, the projection 60 can be formed between the first groove 65*a* and the second groove 65*b*. Thus, the seed layer 101 is now located on the upper face 60*a* of the projection 60.

Figure 4E:
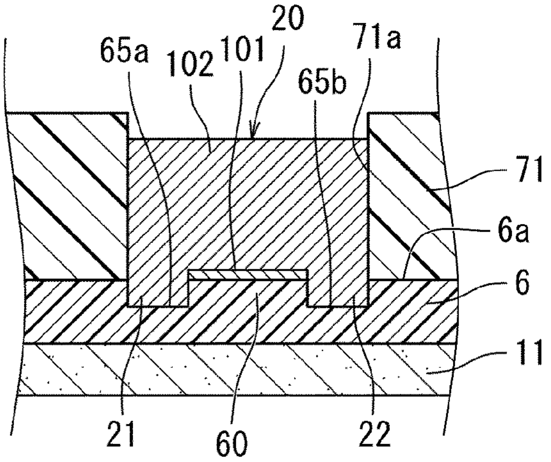
FIG. 4E is a schematic cross-sectional illustration for explaining a method for producing an inductor component.

As illustrated in FIG. 4E, the plating layer 102 is formed on the seed layer 101. More specifically, plating is grown on the seed layer 101 by electrolytic plating to thereby form the plating layer 102. In this way, the inductor wiring line 20 is formed. At this time, the first leg portion 21 is formed in the first groove 65*a*, and the second leg portion 22 is formed in the second groove 65*b*.

Figure 4F:
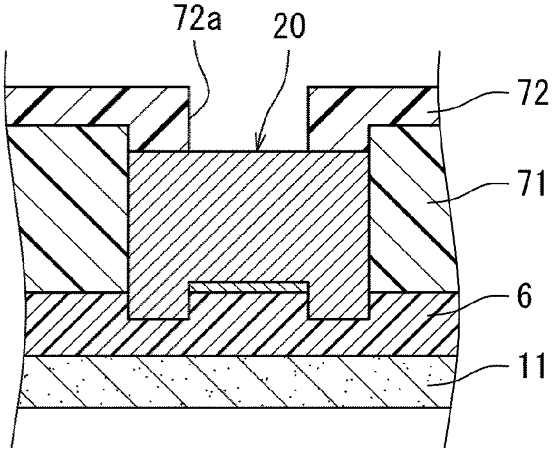
FIG. 4F is a schematic cross-sectional illustration for explaining a method for producing an inductor component.

As illustrated in FIG. 4F, the second insulation layer 72 is formed on the inductor wiring line 20 and the first insulation layer 71. As the second insulation layer 72, for example, a photosensitive permanent film is used. More specifically, as with the first insulation layer 71, a material for the second insulation layer 72 is applied onto the inductor wiring line 20 and the first insulation layer 71, and then subjected to exposure. Developing is then performed. This causes a cavity 72*a* to be created in the second insulation layer 72. At the cavity 72*a*, part of the upper surface of the inductor wiring line 20 is exposed.

Figure 4G:
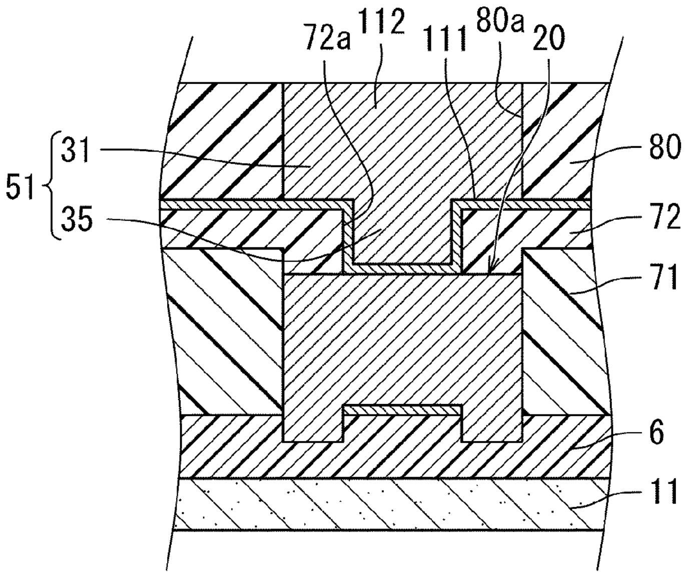
FIG. 4G is a schematic cross-sectional illustration for explaining a method for producing an inductor component.

As illustrated in FIG. 4G, the seed layer 111 is formed by sputtering on the following locations the inner face of the cavity 72*a* in the second insulation layer 72; the exposed portion of the upper face of the inductor wiring line 20; and the upper face of the second insulation layer 72. A resist film 80 is formed on the seed layer 111, and a cavity 80*a* is provided in the resist film 80 at a location corresponding to the first vertical wiring line 51. Plating is grown on the seed layer 111 by electrolytic plating to thereby form the plating layer 112 in the cavity 72*a* and in the cavity 80*a*. As a result, the via-wiring line 35 is formed in the cavity 72*a*, and the first columnar wiring line 31 is formed in the cavity 80*a*. In this way, the first vertical wiring line 51 is formed.

Figure 4H:
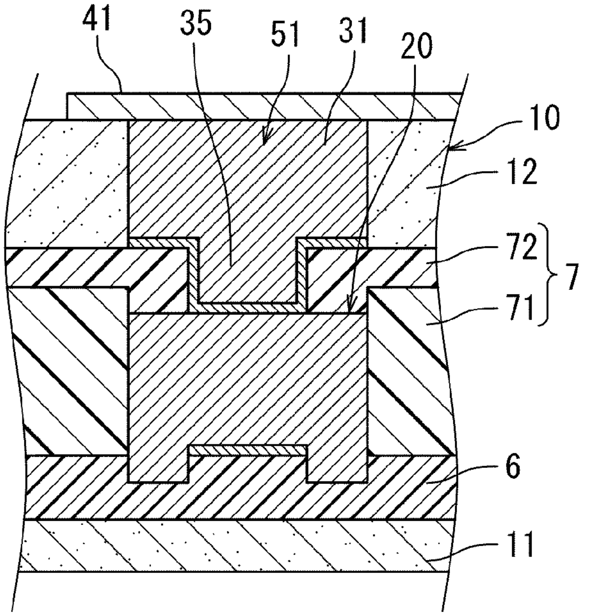
FIG. 4H is a schematic cross-sectional illustration for explaining a method for producing an inductor component.

As illustrated in FIG. 4H, the resist film 80 is stripped off, and the resulting exposed portion of the seed layer 111 is removed. The second magnetic layer 12 is then formed on the second insulation layer 72 such that the upper face of the first vertical wiring line 51 is exposed. Subsequently, the first outer terminal 41 is formed on the upper face of the first vertical wiring line 51. In this way, the inductor component 1 is produced.

Second Embodiment

Configuration

Figure 5:
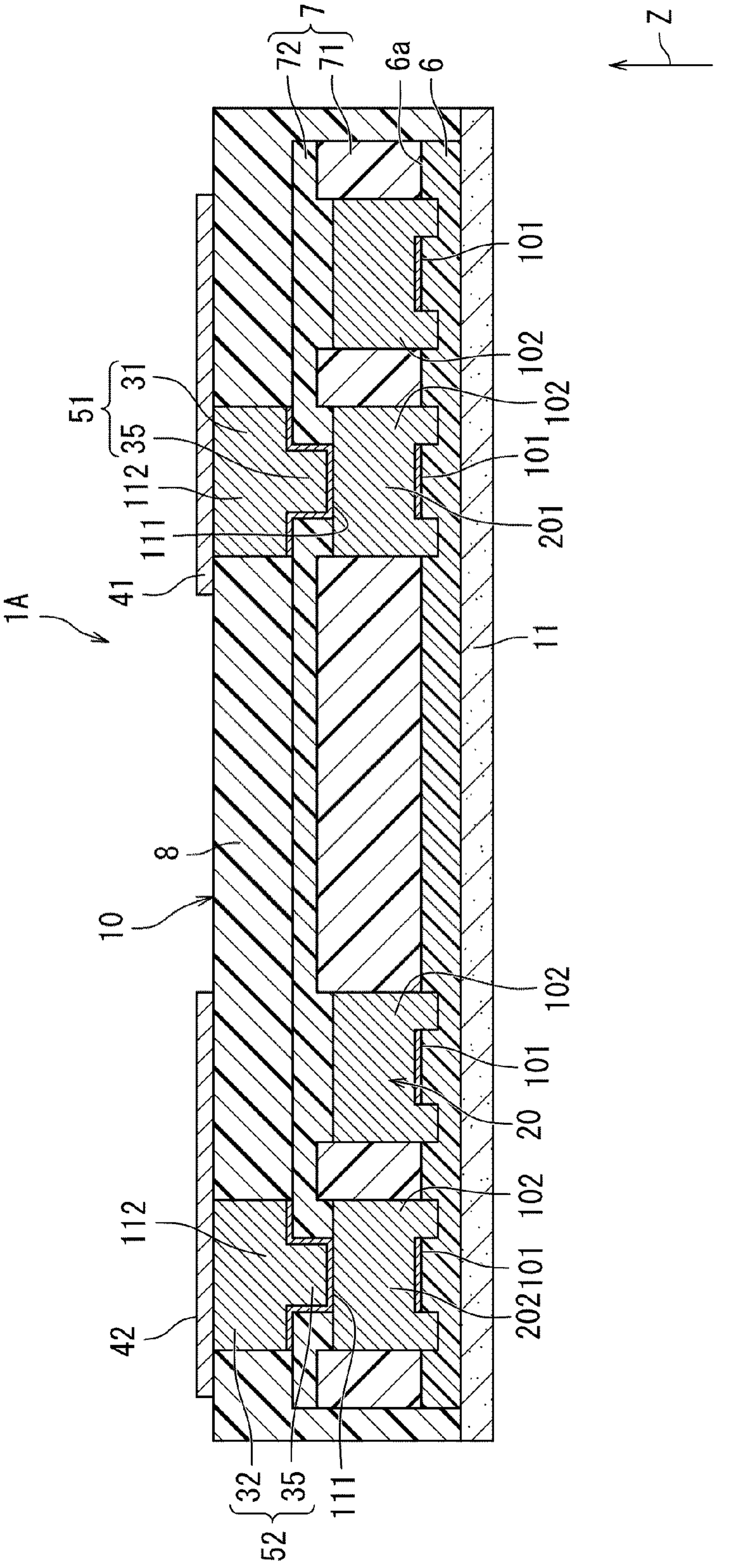
FIG. 5 is a cross-sectional view of an inductor component according to a second embodiment.

FIG. 5 is a cross-sectional view of an inductor component according to a second embodiment. FIG. 5 illustrates a cross-section corresponding to the cross-section illustrated in FIG. 2. The second embodiment differs from the first embodiment in the configuration of the base body. Features of the configuration that differ from those according to the first embodiment are described below. Other features of the configuration are the same as those according to the first embodiment, and designated by the same reference signs as those in the first embodiment to avoid repeated descriptions of such features.

As illustrated in FIG. 5, in an inductor component 1A according to the second embodiment, the base body 10 includes a non-magnetic insulation layer 8 containing no magnetic substance. That is, the base body 10 includes the non-magnetic insulation layer 8 instead of the second magnetic layer 12 described above with reference to the first embodiment (FIG. 2). The base body 10 includes the first magnetic layer 11, and the non-magnetic insulation layer 8 disposed over the first magnetic layer 11.

The non-magnetic insulation layer 8 is made of an insulating material containing no magnetic substance, and includes, for example, one of the following resins: an epoxy-based resin, a phenol-based resin, a polyimide-based resin, an acrylic-based resin, and a vinyl ether-based resin. According to the configuration mentioned above, the base body 10 includes the non-magnetic insulation layer 8. This allows for further improved high-frequency characteristics of the inductor wiring line 20.

Production Method

Reference is now made to a method for producing the inductor component 1A.

Figure 6:
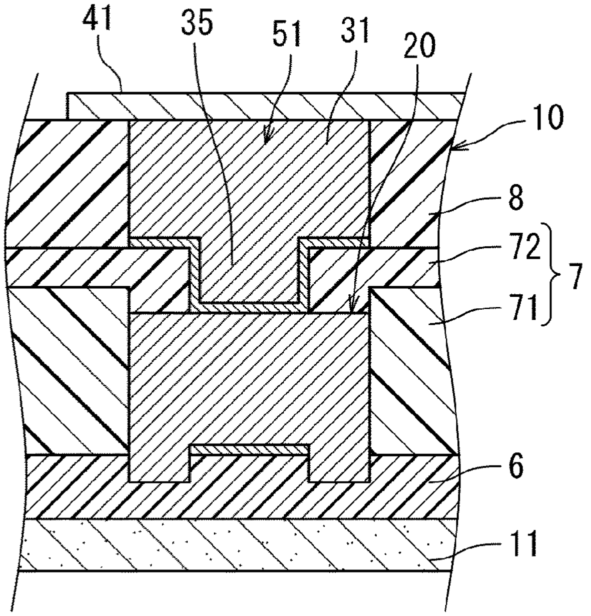
FIG. 6 is a schematic cross-sectional illustration for explaining a method for producing an inductor component.

First, the inductor component 1A is produced by the same production method as that according to the first embodiment as illustrated in FIGS. 4A to 4G. Subsequently, the resist film 80 illustrated in FIG. 4G is stripped off, and the resulting exposed portion of the seed layer 111 is removed. Then, as illustrated in FIG. 6, the non-magnetic insulation layer 8 is formed on the second insulation layer 72 such that the upper face of the first vertical wiring line 51 is exposed. Subsequently, the first outer terminal 41 is formed on the upper face of the first vertical wiring line 51. In this way, the inductor component 1A is produced.

Third Embodiment

Configuration

Figure 7:
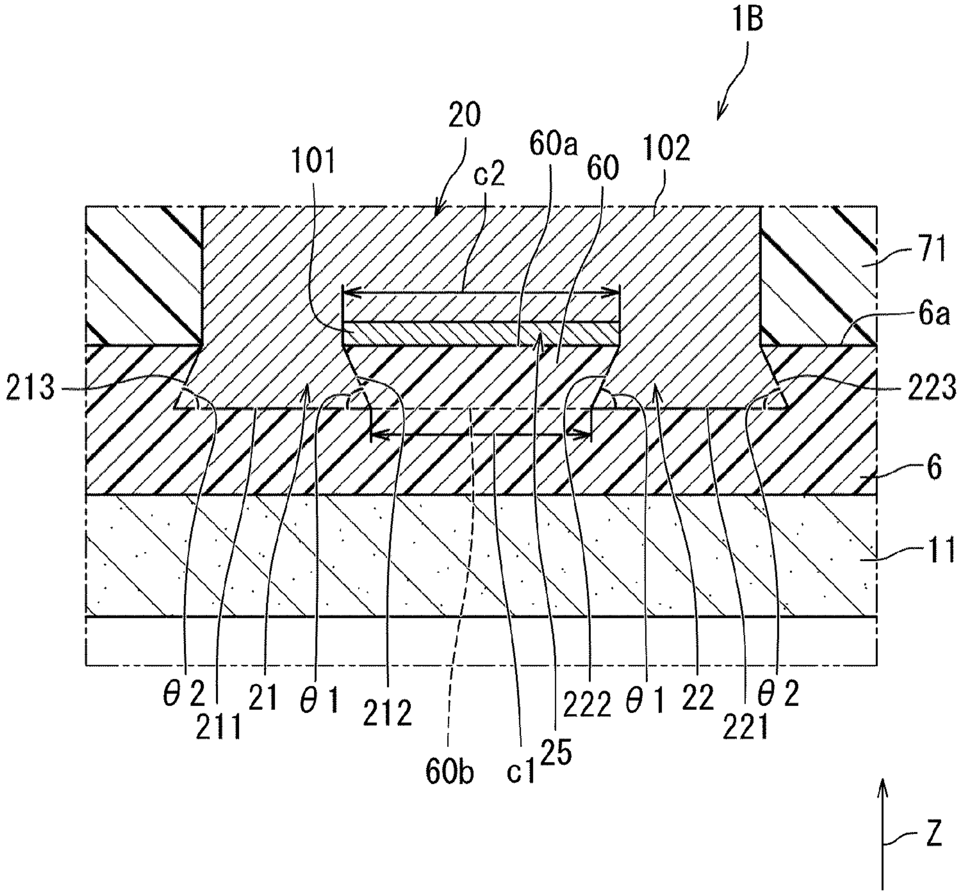
FIG. 7 is a cross-sectional view of an inductor component according to a third embodiment.

FIG. 7 is a cross-sectional view of an inductor component according to a third embodiment. FIG. 7 illustrates a cross-section corresponding to the cross-section illustrated in FIG. 3. The third embodiment differs from the first embodiment in the configuration of the projection of the underlying insulation layer and in the configuration of the leg portions of the inductor wiring line. Features of the configurations that differ from those according to the first embodiment are described below. Other features of the configurations are the same as those according to the first embodiment, and designated by the same reference signs as those in the first embodiment to avoid repeated descriptions of such features.

As illustrated in FIG. 7, in an inductor component 1B according to the third embodiment, the upper face 60*a* of the projection 60 has a width c2 greater than a width c1 of the lowermost part 60*b* of the projection 60 as seen in the first cross-section. Due to the configuration mentioned above, the projection 60 has a wedge-like shape, which allows for further improved adhesion between the underlying insulation layer 6 and the inductor wiring line 20.

As illustrated in FIG. 7, the first leg portion 21 has a lower face 211, an inner side face 212, and an outer side face 213 as seen in the first cross-section. The inner side face 212 is connected to an end portion of the lower face 211 in the width direction, and located near the projection 60. The outer side face 213 is connected to an end portion of the lower face 211 in the width direction, and located opposite from the projection 60.

The lower face 211 and the inner side face 212 form a first angle θ1. The lower face 211 and the outer side face 213 form a second angle θ2. At least one of the first angle θ1 and the second angle θ2 is an acute angle. In a preferred configuration, the acute angle is greater than or equal to 75° and less than 90° (i.e., from 75° less than 90°). As a result, at least one of the inner corner part near the inner side face 212, and the outer corner part near the outer side face 213 has a wedge-like shape. This allows for further improved adhesion between the underlying insulation layer 6 and the inductor wiring line 20.

In a preferred configuration, as seen in the first cross-section, each of the first angle θ1 and the second angle θ2 is an acute angle. As a result, both the inner corner part near the inner side face 212, and the outer corner part near the outer side face 213 have a wedge-like shape. This allows for further improved adhesion between the underlying insulation layer 6 and the inductor wiring line 20. The first angle θ1 and the second angle θ2 may be the same angle, or may be different angles.

As illustrated in FIG. 7, the second leg portion 22 has a lower face 221, an inner side face 222, and an outer side face 223 as seen in the first cross-section. The inner side face 222 is connected to an end portion of the lower face 221 in the width direction, and located near the projection 60. The outer side face 223 is connected to an end portion of the lower face 221 in the width direction, and located opposite from the projection 60.

The lower face 221 and the inner side face 222 form the first angle θ1. The lower face 221 and the outer side face 223 form the second angle θ2. At least one of the first angle θ1 and the second angle θ2 is an acute angle. In a preferred configuration, the acute angle is greater than or equal to 75° and less than 90° (i.e., from 75° to less than 90°). As a result, at least one of the inner corner part near the inner side face 222, and the outer corner part near the outer side face 223 has a wedge-like shape. This allows for further improved adhesion between the underlying insulation layer 6 and the inductor wiring line 20.

In a preferred configuration, as seen in the first cross-section, each of the first angle θ1 and the second angle θ2 is an acute angle. As a result, both the inner corner part near the inner side face 222, and the outer corner part near the outer side face 223 have a wedge-like shape. This allows for further improved adhesion between the underlying insulation layer 6 and the inductor wiring line 20. The first angle θ1 and the second angle θ2 may be the same angle, or may be different angles.

It may suffice that in at least one of the first leg portion 21 and the second leg portion 22, at least one of the first angle θ1 and the second angle θ2 is an acute angle.

Production Method

Reference is now made to a method for producing the inductor component 1B.

Figure 8A:
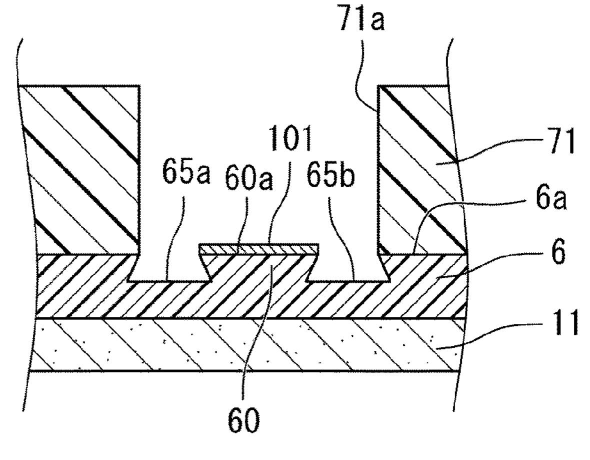
FIG. 8A is a schematic cross-sectional illustration for explaining a method for producing an inductor component.

First, the inductor component 1B is produced by the same production method as that according to the first embodiment as illustrated in FIGS. 4A to 4C. Subsequently, as illustrated in FIG. 8A, developing is performed by use of an organic solvent such as PGMEA and an alkaline developer such as TMAH. This results in the cavity 71*a* being formed in the first insulation layer 71 at a location corresponding to the inductor wiring line 20. During the developing, a portion of the underlying insulation layer 6 is etched away, and the first groove 65*a* and the second groove 65*b* are thus formed in the underlying insulation layer 6. This allows the projection 60 to be formed between the first groove 65*a* and the second groove 65*b*. Thus, the seed layer 101 is now located on the upper face 60*a* of the projection 60.

At this time, the developing is performed for a period of time that is 100% to 150% of the period of time for which developing is performed in a case where the underlying insulation layer 6 is to be etched in only the vertical direction as with the first embodiment illustrated in FIG. 4D. This allows the first groove 65*a* and the second groove 65*b* to be formed in a shape with an increased width in the lower part. This in turn allows the projection 60 to be formed in a shape with a decreased width in the lower part.

Figure 8B:
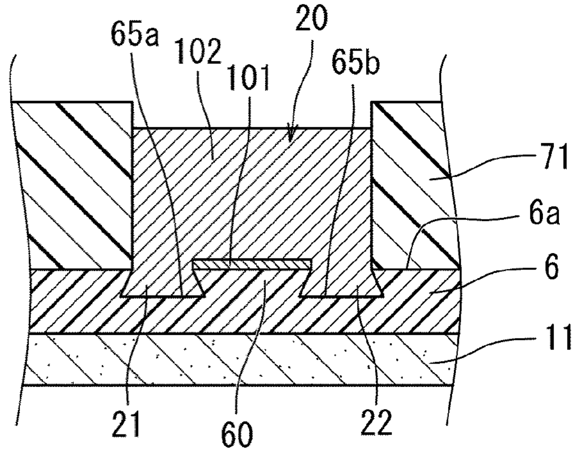
FIG. 8B is a schematic cross-sectional illustration for explaining a method for producing an inductor component.

As illustrated in FIG. 8B, the plating layer 102 is formed on the seed layer 101. More specifically, plating is grown on the seed layer 101 by electrolytic plating to thereby form the plating layer 102. In this way, the inductor wiring line 20 is formed. At this time, the first leg portion 21 is formed in the first groove 65*a*, and the second leg portion 22 is formed in the second groove 65*b*.

Subsequently, the inductor component 1B is produced by the same production method as that according to the first embodiment as illustrated in FIGS. 4F to 4H.

Fourth Embodiment

Configuration

Figure 9:
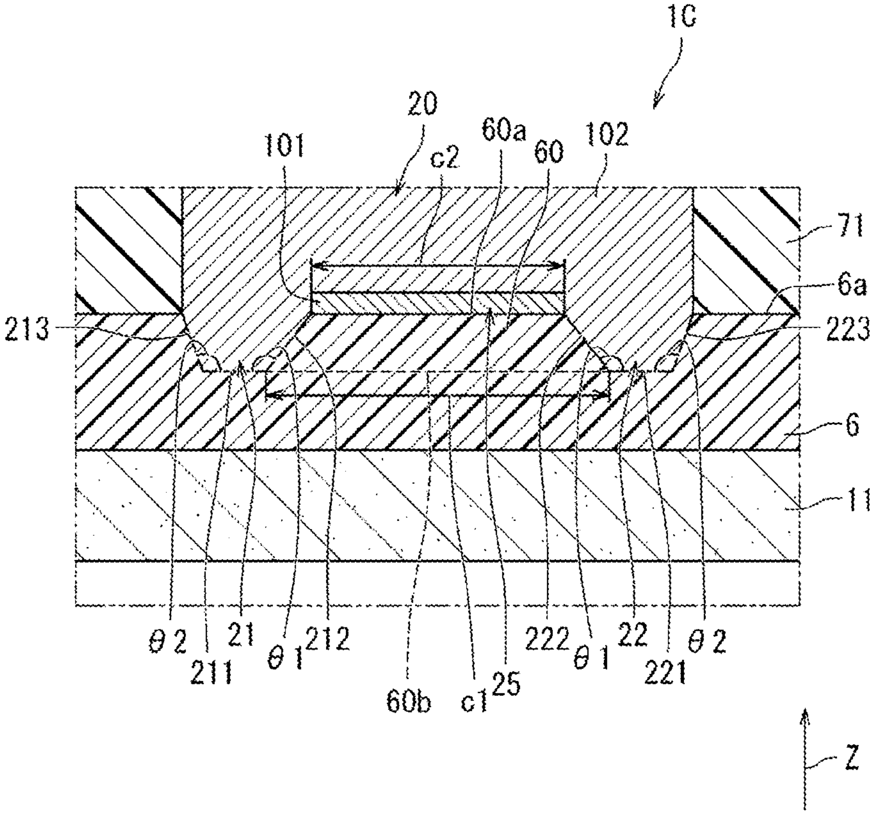
FIG. 9 is a cross-sectional view of an inductor component according to a fourth embodiment.

FIG. 9 is a cross-sectional view of an inductor component according to a fourth embodiment. FIG. 9 illustrates a cross-section corresponding to the cross-section illustrated in FIG. 3. The fourth embodiment differs from the first embodiment in the configuration of the projection of the underlying insulation layer and in the configuration of the leg portions of the inductor wiring line. Other features of the configurations are the same as those according to the first embodiment, and designated by the same reference signs as those in the first embodiment to avoid repeated descriptions of such features.

As illustrated in FIG. 9, in an inductor component 1C according to the fourth embodiment, the width c2 of the upper face 60*a* of the projection 60 is less than the width c1 of the lowermost part 60*b* of the projection 60 as seen in the first cross-section. As a result of the configuration mentioned above, the connecting part between the first leg portion 21 and the crotch portion 25, which are adjacent to the projection 60, has a gentle shape. This allows for further improved high-frequency characteristics of the inductor wiring line 20. Further, the connecting part between the second leg portion 22 and the crotch portion 25, which are adjacent to the projection 60, has a gentle shape. This allows for further improved high-frequency characteristics of the inductor wiring line 20.

As illustrated in FIG. 9, the first leg portion 21 has the lower face 211, the inner side face 212, and the outer side face 213 as seen in the first cross-section. The inner side face 212 is connected to an end portion of the lower face 211 in the width direction, and located near the projection 60. The outer side face 213 is connected to an end portion of the lower face 211 in the width direction, and located opposite from the projection 60.

The lower face 211 and the inner side face 212 form the first angle θ1. The lower face 211 and the outer side face 213 form the second angle θ2. At least one of the first angle θ1 and the second angle θ2 is an obtuse angle. In a preferred configuration, the obtuse angle is greater than 90° and less than or equal to 105° (i.e., from greater than 90° to 105°). As a result, at least one of the inner corner part near the inner side face 212, and the outer corner part near the outer side face 213 has a gentle shape. This allows for further improved high-frequency characteristics of the inductor wiring line 20.

In a preferred configuration, as seen in the first cross-section, each of the first angle θ1 and the second angle θ2 is an obtuse angle. As a result, both the inner corner part near the inner side face 212, and the outer corner part near the outer side face 213 have a gentle shape. This allows for further improved high-frequency characteristics of the inductor wiring line 20. The first angle θ1 and the second angle θ2 may be the same angle, or may be different angles.

As illustrated in FIG. 9, the second leg portion 22 has the lower face 221, the inner side face 222, and the outer side face 223 as seen in the first cross-section. The inner side face 222 is connected to an end portion of the lower face 221 in the width direction, and located near the projection 60. The outer side face 223 is connected to an end portion of the lower face 221 in the width direction, and located opposite from the projection 60.

The lower face 221 and the inner side face 222 form the first angle θ1. The lower face 221 and the outer side face 223 form the second angle θ2. At least one of the first angle θ1 and the second angle θ2 is an obtuse angle. In a preferred configuration, the obtuse angle is greater than 90° and less than or equal to 105° (i.e., from greater than 90° to 105°). As a result, at least one of the inner corner part near the inner side face 222, and the outer corner part near the outer side face 223 has a gentle shape. This allows for further improved high-frequency characteristics of the inductor wiring line 20.

In a preferred configuration, as seen in the first cross-section, each of the first angle θ1 and the second angle θ2 is an obtuse angle. As a result, both the inner corner part near the inner side face 222, and the outer corner part near the outer side face 223 have a gentle shape. This allows for further improved high-frequency characteristics of the inductor wiring line 20. The first angle θ1 and the second angle θ2 may be the same angle, or may be different angles.

It may suffice that in at least one of the first leg portion 21 and the second leg portion 22, at least one of the first angle θ1 and the second angle θ2 is an obtuse angle.

Production Method

Reference is now made to a method for producing the inductor component 1C.

Figure 10A:
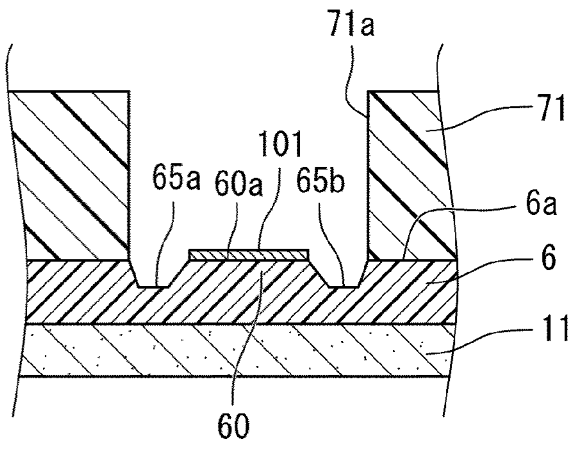
FIG. 10A is a schematic cross-sectional illustration for explaining a method for producing an inductor component.

First, the inductor component 1C is produced by the same production method as that according to the first embodiment as illustrated in FIGS. 4A to 4C. Subsequently, as illustrated in FIG. 10A, developing is performed by use of an organic solvent such as PGMEA and an alkaline developer such as TMAH. This results in the cavity 71*a* being formed in the first insulation layer 71 at a location corresponding to the inductor wiring line 20. During the developing, a portion of the underlying insulation layer 6 is etched away, and the first groove 65*a* and the second groove 65*b* are thus formed in the underlying insulation layer 6. This allows the projection 60 to be formed between the first groove 65*a* and the second groove 65*b*. Thus, the seed layer 101 is now located on the upper face 60*a* of the projection 60.

At this time, the developing is performed for a period of time that is 60% to 100% of the period of time for which developing is performed in a case where the underlying insulation layer 6 is to be etched in only the vertical direction as with the first embodiment illustrated in FIG. 4D. This allows the first groove 65*a* and the second groove 65*b* to be formed in a shape with a decreased width in the lower part. This in turn allows the projection to be formed in a shape with an increased width in the lower part.

Figure 10B:
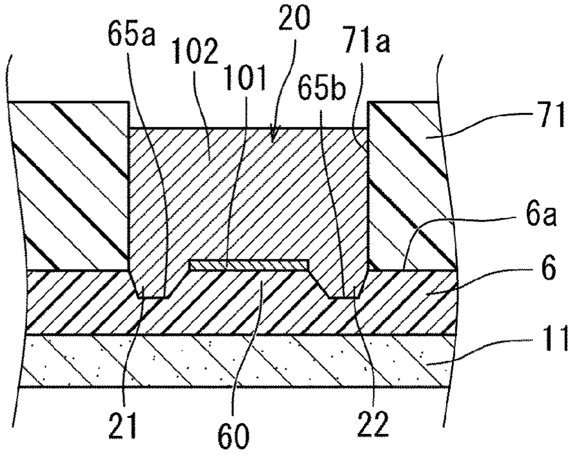
FIG. 10B is a schematic cross-sectional illustration for explaining a method for producing an inductor component.

As illustrated in FIG. 10B, the plating layer 102 is formed on the seed layer 101. More specifically, plating is grown on the seed layer 101 by electrolytic plating to thereby form the plating layer 102. In this way, the inductor wiring line 20 is formed. At this time, the first leg portion 21 is formed in the first groove 65*a*, and the second leg portion 22 is formed in the second groove 65*b*.

Subsequently, the inductor component 1C is produced by the same production method as that according to the first embodiment as illustrated in FIGS. 4F to 4H.

Modification

A modification of the inductor component is described below.

As seen in the first cross-section, in the first leg portion 21, one of the first angle θ1 and the second angle θ2 is an obtuse angle, and the other one of the first angle θ1 and the second angle θ2 is the acute angle described above with reference to the third embodiment. As a result of the configuration mentioned above, one of the inner corner part near the inner side face, and the outer corner part near the outer side face has a wedge-like shape due to its acute angle. This allows for further improved adhesion between the underlying insulation layer 6 and the inductor wiring line 20. The other one of the inner corner part near the inner side face, and the outer corner part near the outer side face has a gentle shape due to its obtuse angle. This allows for further improved high-frequency characteristics of the inductor wiring line 20.

As seen in the first cross-section, in the second leg portion 22, one of the first angle θ1 and the second angle θ2 is an obtuse angle, and the other one of the first angle θ1 and the second angle θ2 is the acute angle described above with reference to the third embodiment. As a result of the configuration mentioned above, one of the inner corner part near the inner side face, and the outer corner part near the outer side face has a wedge-like shape due to its acute angle. This allows for further improved adhesion between the underlying insulation layer 6 and the inductor wiring line 20. The other one of the inner corner part near the inner side face, and the outer corner part near the outer side face has a gentle shape due to its obtuse angle. This allows for further improved high-frequency characteristics of the inductor wiring line 20.

It may suffice that in at least one of the first leg portion 21 and the second leg portion 22, one of the first angle θ1 and the second angle θ2 is an obtuse angle, and the other one of the first angle θ1 and the second angle θ2 is an acute angle.

Fifth Embodiment

Configuration

Figure 11:
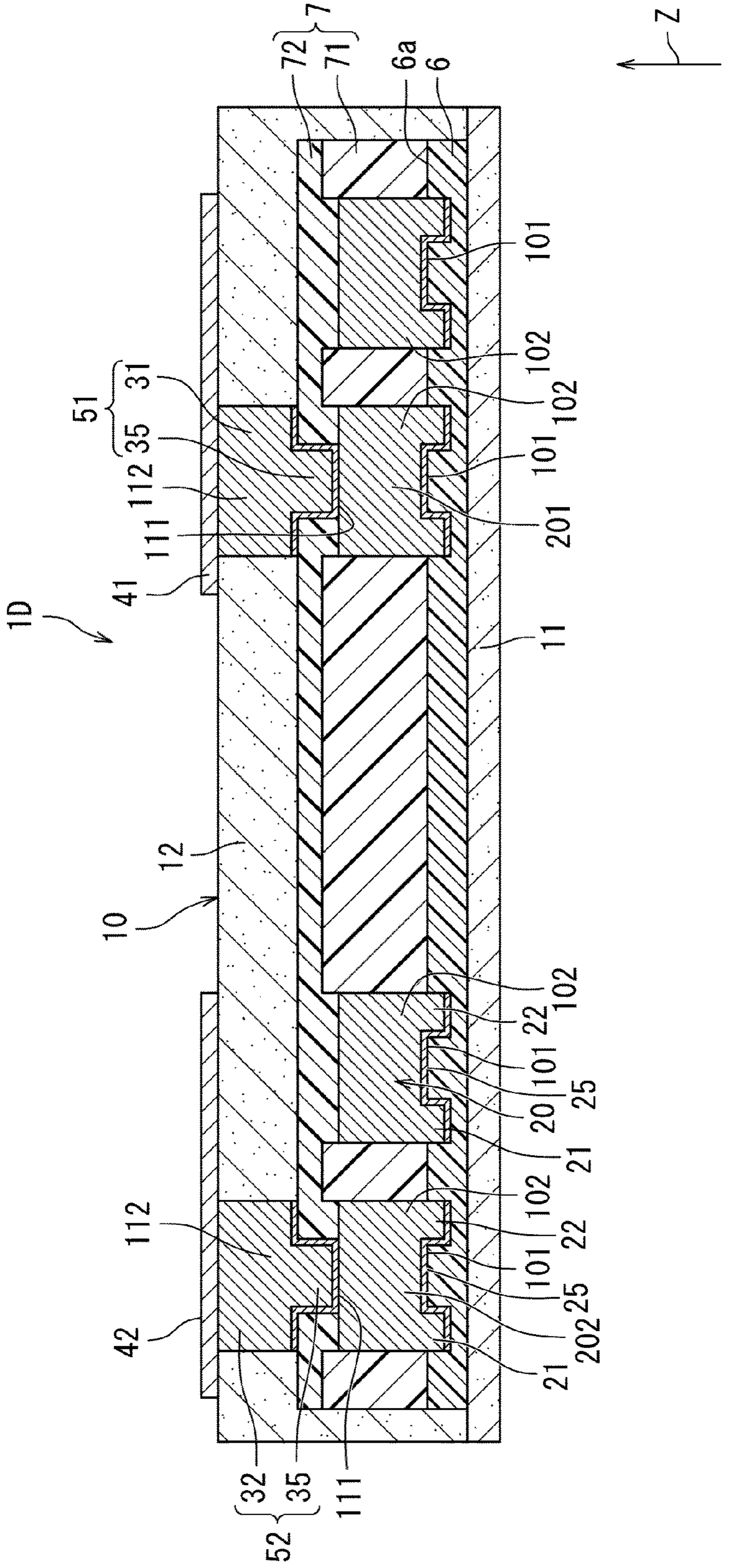
FIG. 11 is a cross-sectional view of an inductor component according to a fifth embodiment.

FIG. 11 is a cross-sectional view of an inductor component according to a fifth embodiment. FIG. 11 illustrates a cross-section corresponding to the cross-section illustrated in FIG. 2. The fifth embodiment differs from the first embodiment in the configuration of the seed layer. Features of the configuration that differ from those according to the first embodiment are described below. Other features of the configuration are the same as those according to the first embodiment, and designated by the same reference signs as those in the first embodiment to avoid repeated descriptions of such features.

As illustrated in FIG. 11, in an inductor component 1D according to the fifth embodiment, the seed layer 101 is disposed on the entire lower face of the inductor wiring line 20 as seen in the first cross-section. More specifically, as seen in the first cross-section, the seed layer 101 is disposed so as to extend continuously on the following locations: the lower face of the crotch portion 25; the lower face and the inner side face of the first leg portion 21; and the lower face and the inner side face of the second leg portion 22. The configuration mentioned above allows for further improved adhesion between the underlying insulation layer 6 and the inductor wiring line 20.

Although the cross-sections of four inductor wiring lines 20 are depicted in FIG. 11, it may suffice that the cross-section of at least one of the four inductor wiring lines 20 satisfies the features mentioned above.

Production Method

Reference is now made to a method for producing the inductor component 1D.

Figure 12A:
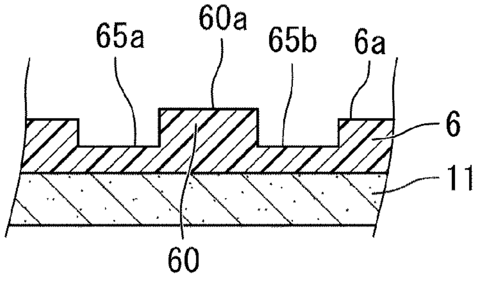
FIG. 12A is a schematic cross-sectional illustration for explaining a method for producing an inductor component.

As illustrated in FIG. 12A, the underlying insulation layer 6 is formed on the first magnetic layer 11. As the underlying insulation layer 6, for example, a polyimide-based resin is used. The first groove 65*a* and the second groove 65*b* are formed by photolithography at the first major face 6*a* of the underlying insulation layer 6. This allows the projection 60 to be formed between the first groove 65*a* and the second groove 65*b*.

Figure 12B:
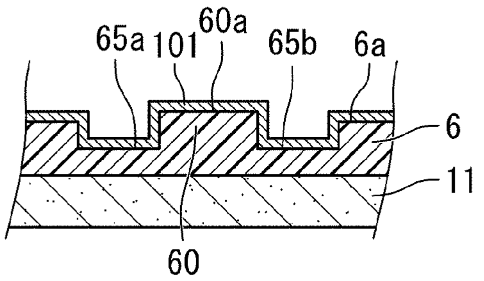
FIG. 12B is a schematic cross-sectional illustration for explaining a method for producing an inductor component.

As illustrated in FIG. 12B, the seed layer 101 is formed by sputtering on the following locations: the first major face 6*a* of the underlying insulation layer 6 including the upper face 60*a* of the projection 60; and the respective inner faces of the first groove 65*a* and the second groove 65*b*.

Figure 12C:
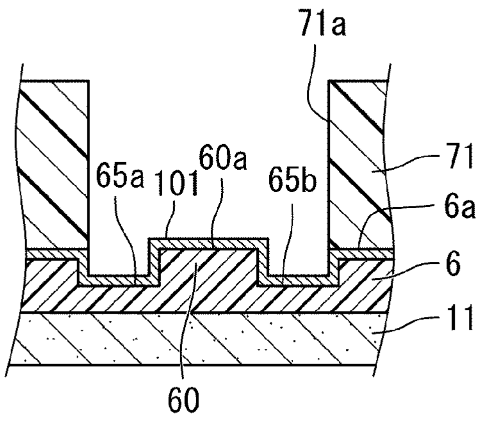
FIG. 12C is a schematic cross-sectional illustration for explaining a method for producing an inductor component.

As illustrated in FIG. 12C, the first insulation layer 71 is formed on the underlying insulation layer 6 so as to cover the seed layer 101. As the first insulation layer 71, for example, a photosensitive permanent film is used. Subsequently, exposure and developing are performed to form the cavity 71*a* in the first insulation layer 71 at a location corresponding to the inductor wiring line 20.

Figure 12D:
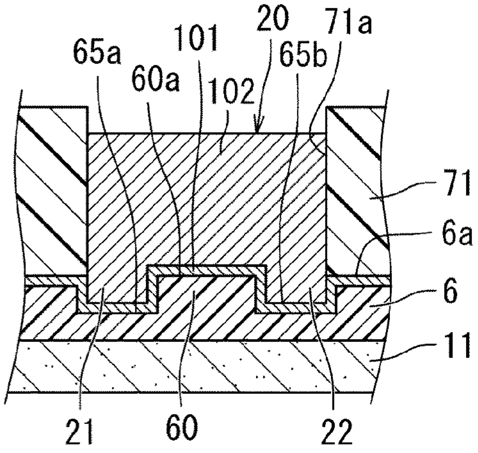
FIG. 12D is a schematic cross-sectional illustration for explaining a method for producing an inductor component.

As illustrated in FIG. 12D, the plating layer 102 is formed on the seed layer 101. More specifically, plating is grown on the seed layer 101 by electrolytic plating to thereby form the plating layer 102. In this way, the inductor wiring line 20 is formed. At this time, the first leg portion 21 is formed in the first groove 65*a*, and the second leg portion 22 is formed in the second groove 65*b*.

Subsequently, the inductor component 1D is produced by the same production method as that according to the first embodiment illustrated in FIGS. 4F to 4H.

Sixth Embodiment

Configuration

Figure 13:
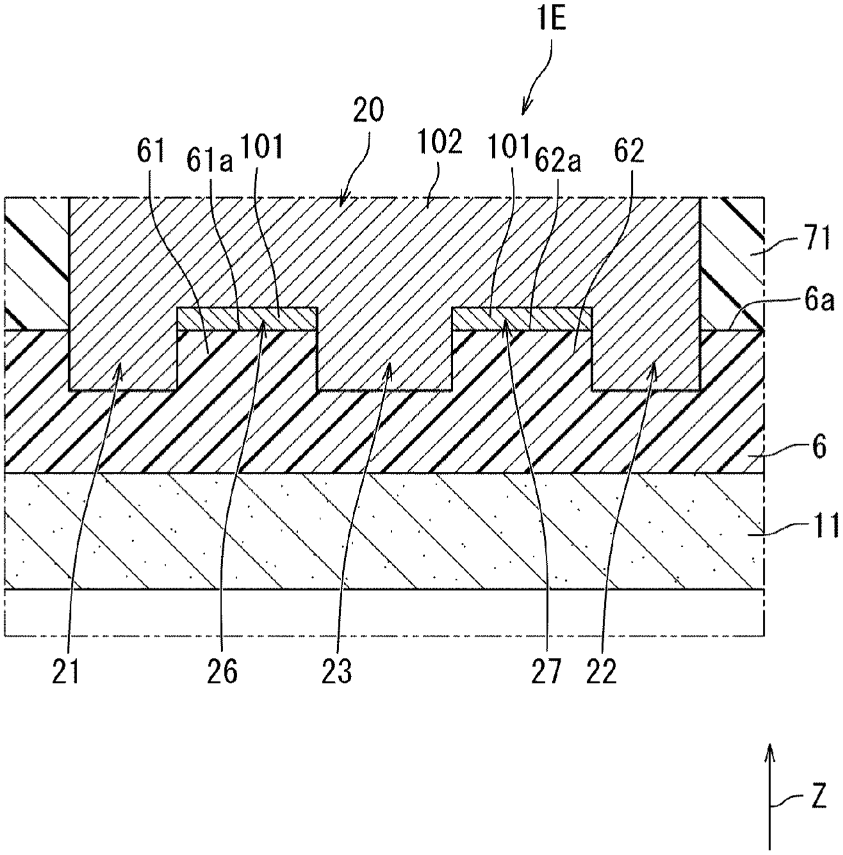
FIG. 13 is a cross-sectional view of an inductor component according to a sixth embodiment.

FIG. 13 is a cross-sectional view of an inductor component according to a sixth embodiment. FIG. 13 illustrates a cross-section corresponding to the cross-section illustrated in FIG. 3. The sixth embodiment differs from the first embodiment in the following features: the number of leg portions, and the number of projections. Such features different from those according to the first embodiment are described below. Other features are the same as those according to the first embodiment, and designated by the same reference signs as those in the first embodiment to avoid repeated descriptions of such features.

As illustrated in FIG. 13, in an inductor component 1E according to the sixth embodiment, the inductor wiring line 20 further includes a third leg portion 23 disposed between the first leg portion 21 and the second leg portion 22 as seen in the first cross-section. The inductor wiring line 20 includes a first crotch portion 26 disposed between the first leg portion 21 and the third leg portion 23, and a second crotch portion 27 disposed between the second leg portion 22 and the third leg portion 23.

The underlying insulation layer 6 includes a first projection 61, and a second projection 62. The first projection 61 is located between the first leg portion 21 and the third leg portion 23, and faces the first crotch portion 26. The second projection 62 is located between the second leg portion 22 and the third leg portion 23, and faces the second crotch portion 27. At least part of the seed layer 101 is disposed at the first crotch portion 26 and in contact with an upper face 61*a* of the first projection 61, and is disposed at the second crotch portion 27 and in contact with an upper face 62*a* of the second projection 62. The configuration mentioned above allows for anchoring of the first leg portion 21, the second leg portion 22, and the third leg portion 23 to the underlying insulation layer 6. This further improves the adhesion between the underlying insulation layer 6 and the inductor wiring line 20.

In a preferred configuration, the third leg portion 23 is located in the middle part between the first leg portion 21 and the second leg portion 22. This helps to provide balanced anchoring of the first leg portion 21, the second leg portion 22, and the third leg portion 23 to the underlying insulation layer 6. Alternatively, the third leg portion 23 may be located offset toward one of the first leg portion 21 and the second leg portion 22 relative to the middle part between the first leg portion 21 and the second leg portion 22.

The first leg portion 21, the second leg portion 22, and the third leg portion 23 may all have the same width. Alternatively, at least one of these leg portions may differ in width from the other leg portions. The inductor wiring line 20 may have four or more leg portions.

Production Method

Reference is now made to a method for producing the inductor component 1E.

Figure 14A:
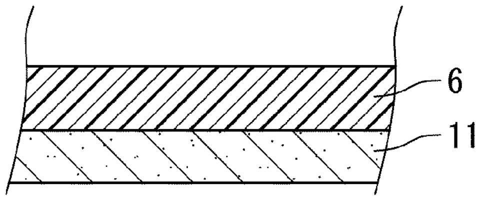
FIG. 14A is a schematic cross-sectional illustration for explaining a method for producing an inductor component.
Figure 14B:
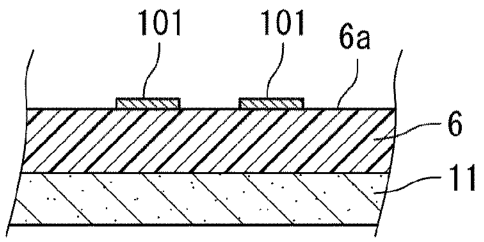
FIG. 14B is a schematic cross-sectional illustration for explaining a method for producing an inductor component.

As illustrated in FIG. 14A, the underlying insulation layer 6 is formed on the first magnetic layer 11. As the underlying insulation layer 6, for example, a polyimide-based resin is used. As illustrated in FIG. 14B, two seed layers 101 are formed on the first major face 6*a* of the underlying insulation layer 6. More specifically, a material for each seed layer 101 is deposited onto the first major face 6*a* by sputtering, and subjected to patterning by photolithography to thereby form two seed layers 101 (a first seed layer 101 and a second seed layer 101).

Figure 14C:
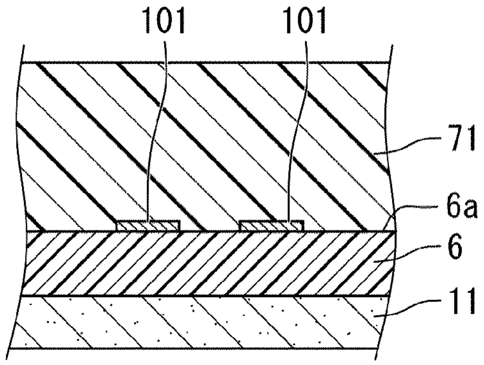
FIG. 14C is a schematic cross-sectional illustration for explaining a method for producing an inductor component.
Figure 14D:
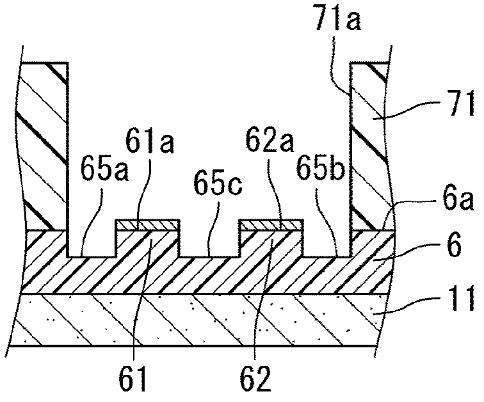
FIG. 14D is a schematic cross-sectional illustration for explaining a method for producing an inductor component.

As illustrated in FIG. 14C, the first insulation layer 71 is formed on the underlying insulation layer 6 so as to cover the seed layer 101. As the first insulation layer 71, for example, a photosensitive permanent film is used. Then, as illustrated in FIG. 14D, the first insulation layer 71 is subjected to exposure to perform developing. As a result, the cavity 71*a* is formed in the first insulation layer 71 at a location corresponding to the inductor wiring line 20, and the first groove 65*a*, the second groove 65*b*, and a third groove 65*c*, which is located between the first groove 65*a* and the second groove 65*b*, are formed in the underlying insulation layer 6. Then, the first projection 61 is formed between the first groove 65*a* and the third groove 65*c*, and the second projection 62 is formed between the second groove 65*b* and the third groove 65*c*. Thus, the first seed layer 101 is now located on the upper face 61*a* of the first projection 61, and the second seed layer 101 is now located on the upper face 62*a* of the second projection 62.

Figure 14E:
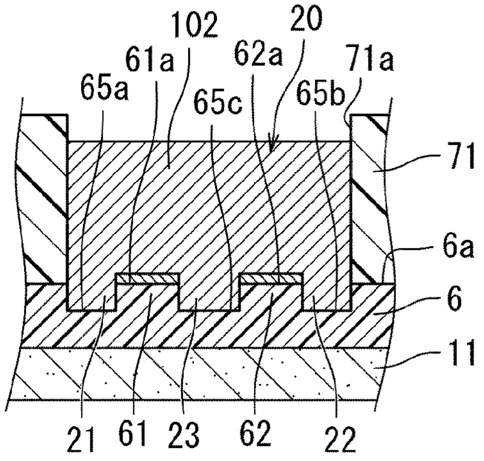
FIG. 14E is a schematic cross-sectional illustration for explaining a method for producing an inductor component.

As illustrated in FIG. 14E, the plating layer 102 is formed on the seed layer 101. More specifically, plating is grown on the seed layer 101 by electrolytic plating to thereby form the plating layer 102. In this way, the inductor wiring line 20 is formed. At this time, the first leg portion 21 is formed in the first groove 65*a*, the second leg portion 22 is formed in the second groove 65*b*, and the third leg portion 23 is formed in the third groove 65*c*.

Subsequently, the inductor component 1E is produced by the same production method as that according to the first embodiment illustrated in FIGS. 4F to 4H.

The present disclosure is not limited to the above embodiments but may be practiced with various variations without departing from the scope and spirit of the present disclosure. For example, features in the first to sixth embodiments may be used in various combinations.

Although the above embodiments employ a single layer of inductor wiring line, multiple inductor wiring lines may be disposed in the first direction. Multiple inductor wiring lines may be disposed in a direction orthogonal to the first direction.

Although the first embodiment described above is directed to an arrangement in which the cross-sections of four inductor wiring lines all include two leg portions as illustrated in FIG. 2, the cross-section of at least one inductor wiring line may include a number of leg portions different from the number of leg portions in the other inductor wiring lines. For example, of the cross-sections of inductor wiring lines of adjacent turns, the cross-section of at least one inductor wiring line may have two leg portions, and the cross-section of the other inductor wiring line may have three or more leg portions.

<1> An inductor component including a base body; an underlying insulation layer disposed within the base body and including a first major face; an inductor wiring line disposed on the first major face within the base body, the inductor wiring line extending along the first major face; and a covering insulation layer disposed within the base body, the covering insulation layer covering at least part of the inductor wiring line. The inductor wiring line includes a seed layer, and a plating layer disposed in contact with the seed layer. As seen in a first cross-section orthogonal to a direction in which the inductor wiring line extends, the inductor wiring line includes a first leg portion and a second leg portion that are disposed in opposite end portions of a lower face of the inductor wiring line in a width direction, the lower face being a face near the first major face, the width direction being a direction parallel to the first major face, the first leg portion and the second leg portion being embedded in the underlying insulation layer, and a crotch portion disposed between the first leg portion and the second leg portion. The underlying insulation layer includes a projection, the projection being located between the first leg portion and the second leg portion and facing the crotch portion, and at least part of the seed layer is disposed at the crotch portion and in contact with an upper face of the projection.

<2> The inductor component according to Item <1>, in which as seen in the first cross-section, the first leg portion has a height of greater than or equal to 1 μm and less than or equal to 3 μm (i.e., from 1 μm to 3 μm) in a direction orthogonal to the first major face.

<3> The inductor component according to Item <1> or <2>, in which as seen in the first cross-section, the projection has a rectangular shape, and has an aspect ratio of greater than or equal to 0.02 and less than or equal to 0.3 (i.e., from 0.02 to 0.3), the aspect ratio being determined by dividing a height of the projection in a direction orthogonal to the first major face by a width of the projection in the direction parallel to the first major face.

<4> The inductor component according to any one of Items <1> to <3>, in which as seen in the first cross-section, the projection has a rectangular shape, and has, in the direction parallel to the first major face, a width that is greater than or equal to 30% and less than or equal to 80% (i.e., from 30% to 80%) of a width of the inductor wiring line in the direction parallel to the first major face.

<5> The inductor component according to any one of Items <1> to <4>, in which the base body includes a non-magnetic insulation layer containing no magnetic substance.

<6> The inductor component according to Item <1> or <2>, in which as seen in the first cross-section, the upper face of the projection has, in the direction parallel to the first major face, a width that is greater than a width of a lowermost part of the projection in the direction parallel to the first major face.

<7> The inductor component according to any one of Items <1>, <2>, and <6>, in which as seen in the first cross-section, the first leg portion includes a lower face, an inner side face connected to an end portion of the lower face in the width direction parallel to the first major face, the inner side face being located near the projection, and an outer side face connected to an end portion of the lower face in the width direction, the outer side face being located opposite from the projection. The lower face and the inner side face form a first angle, the lower face and the outer side face form a second angle, and at least one of the first angle and the second angle is an acute angle.

<8> The inductor component according to Item <7>, in which as seen in the first cross-section, each of the first angle and the second angle is an acute angle.

<9> The inductor component according to Item <1> or <2>, in which as seen in the first cross-section, the upper face of the projection has, in the direction parallel to the first major face, a width that is less than a width of a lowermost part of the projection in the direction parallel to the first major face.

<10> The inductor component according to any one of Items <1>, <2>, and <9>, in which as seen in the first cross-section, the first leg portion includes a lower face, an inner side face connected to an end portion of the lower face in the width direction parallel to the first major face, the inner side face being located near the projection, and an outer side face connected to an end portion of the lower face in the width direction, the outer side face being located opposite from the projection. The lower face and the inner side face form a first angle, the lower face and the outer side face form a second angle, and at least one of the first angle and the second angle is an obtuse angle.

<11> The inductor component according to Item <10>, in which as seen in the first cross-section, each of the first angle and the second angle is an obtuse angle.

<12> The inductor component according to Item <1> or <2>, in which as seen in the first cross-section, the first leg portion includes a lower face, an inner side face connected to an end portion of the lower face in the width direction parallel to the first major face, the inner side face being located near the projection, and an outer side face connected to an end portion of the lower face in the width direction, the outer side face being located opposite from the projection. The lower face and the inner side face form a first angle, the lower face and the outer side face form a second angle, one of the first angle and the second angle is an acute angle, and another one of the first angle and the second angle is an obtuse angle.

<13> The inductor component according to any one of Items <1> to <12>, in which as seen in the first cross-section, the seed layer is disposed on an entirety of a face of the inductor wiring line, the face being a face in contact with the underlying insulation layer.

<14> The inductor component according to any one of Items <1> to <13>, in which as seen in the first cross-section, the inductor wiring line further includes a third leg portion, the third leg portion being disposed between the first leg portion and the second leg portion. The crotch portion includes a first crotch portion disposed between the first leg portion and the third leg portion, and a second crotch portion disposed between the second leg portion and the third leg portion. The projection includes a first projection located between the first leg portion and the third leg portion and facing the first crotch portion, and a second projection located between the second leg portion and the third leg portion and facing the second crotch portion. At least part of the seed layer is disposed at the first crotch portion and in contact with an upper face of the first crotch portion, and is disposed at the second crotch portion and in contact with an upper face of the second projection.

What is claimed is:

1. An inductor component comprising:

a base body;

an underlying insulation layer within the base body and including a first major face;

an inductor wiring line on the first major face within the base body, the inductor wiring line extending along the first major face; and a covering insulation layer within the base body, the covering insulation layer covering at least part of the inductor wiring line, wherein the inductor wiring line includes a seed layer, and a plating layer disposed in contact with the seed layer, as seen in a first cross-section orthogonal to a direction in which the inductor wiring line extends, the inductor wiring line includes a first leg portion and a second leg portion that are in opposite end portions of a lower face of the inductor wiring line in a width direction, the lower face being a face near the first major face, the width direction being a direction parallel to the first major face, the first leg portion and the second leg portion being embedded in the underlying insulation layer, and a crotch portion between the first leg portion and the second leg portion, the underlying insulation layer includes a projection, the projection being located between the first leg portion and the second leg portion and facing the crotch portion, and at least part of the seed layer is at the crotch portion and in contact with an upper face of the projection.

2. The inductor component according to claim 1, wherein as seen in the first cross-section, the first leg portion has a height of from 1 μm to 3 μm in a direction orthogonal to the first major face.

3. The inductor component according to claim 1, wherein as seen in the first cross-section, the projection has a rectangular shape, and has an aspect ratio of from 0.02 to 0.3, the aspect ratio being determined by dividing a height of the projection in a direction orthogonal to the first major face by a width of the projection in the direction parallel to the first major face.

4. The inductor component according to claim 1, wherein as seen in the first cross-section, the projection has a rectangular shape, and has, in the direction parallel to the first major face, a width that is from 30% to 80% of a width of the inductor wiring line in the direction parallel to the first major face.

5. The inductor component according to claim 1, wherein the base body includes a non-magnetic insulation layer containing no magnetic substance.

6. The inductor component according to claim 1, wherein as seen in the first cross-section, the upper face of the projection has, in the direction parallel to the first major face, a width that is greater than a width of a lowermost part of the projection in the direction parallel to the first major face.

7. The inductor component according to claim 1, wherein as seen in the first cross-section,
the first leg portion includes
a lower face,
an inner side face connected to an end portion of the lower face in the width direction parallel to the first major face, the inner side face being located near the projection, and
an outer side face connected to another end portion of the lower face in the width direction, the outer side face being located opposite from the projection,
the lower face and the inner side face define a first angle,
the lower face and the outer side face define a second angle, and
at least one of the first angle and the second angle is an acute angle.

8. The inductor component according to claim 7, wherein as seen in the first cross-section, each of the first angle and the second angle is an acute angle.

9. The inductor component according to claim 1, wherein as seen in the first cross-section, the upper face of the projection has, in the direction parallel to the first major face, a width that is less than a width of a lowermost part of the projection in the direction parallel to the first major face.

10. The inductor component according to claim 1, wherein
as seen in the first cross-section,
the first leg portion includes
a lower face,
an inner side face connected to an end portion of the lower face in the width direction parallel to the first major face, the inner side face being located near the projection, and
an outer side face connected to another end portion of the lower face in the width direction, the outer side face being located opposite from the projection,
the lower face and the inner side face define a first angle,
the lower face and the outer side face define a second angle, and
at least one of the first angle and the second angle is an obtuse angle.

11. The inductor component according to claim 10, wherein
as seen in the first cross-section, each of the first angle and the second angle is an obtuse angle.

12. The inductor component according to claim 1, wherein
as seen in the first cross-section,
the first leg portion includes
a lower face,
an inner side face connected to an end portion of the lower face in the width direction parallel to the first major face, the inner side face being located near the projection, and
an outer side face connected to another end portion of the lower face in the width direction, the outer side face being located opposite from the projection,
the lower face and the inner side face define a first angle,
the lower face and the outer side face define a second angle,
one of the first angle and the second angle is an acute angle, and
another one of the first angle and the second angle is an obtuse angle.

13. The inductor component according to claim 1, wherein
as seen in the first cross-section, the seed layer is disposed on an entirety of a face of the inductor wiring line, the face being a face in contact with the underlying insulation layer.

14. The inductor component according to claim 1, wherein
as seen in the first cross-section,
the inductor wiring line further includes a third leg portion, the third leg portion being disposed between the first leg portion and the second leg portion,
the crotch portion includes
a first crotch portion disposed between the first leg portion and the third leg portion, and
a second crotch portion disposed between the second leg portion and the third leg portion,
the projection includes
a first projection located between the first leg portion and the third leg portion and facing the first crotch portion, and
a second projection located between the second leg portion and the third leg portion and facing the second crotch portion, and
at least part of the seed layer is disposed at the first crotch portion and in contact with an upper face of the first projection, and is disposed at the second crotch portion and in contact with an upper face of the second projection.

15. The inductor component according to claim 2, wherein
as seen in the first cross-section, the projection has a rectangular shape, and has an aspect ratio of from 0.02 to 0.3, the aspect ratio being determined by dividing a height of the projection in a direction orthogonal to the first major face by a width of the projection in the direction parallel to the first major face.

16. The inductor component according to claim 2, wherein as seen in the first cross-section, the projection has a rectangular shape, and has, in the direction parallel to the first major face, a width that is from 30% to 80% of a width of the inductor wiring line in the direction parallel to the first major face.

17. The inductor component according to claim 2, wherein the base body includes a non-magnetic insulation layer containing no magnetic substance.

18. The inductor component according to claim 2, wherein as seen in the first cross-section, the upper face of the projection has, in the direction parallel to the first major face, a width that is greater than a width of a lowermost part of the projection in the direction parallel to the first major face.

19. The inductor component according to claim 2, wherein as seen in the first cross-section, the first leg portion includes a lower face, an inner side face connected to an end portion of the lower face in the width direction parallel to the first major face, the inner side face being located near the projection, and an outer side face connected to another end portion of the lower face in the width direction, the outer side face being located opposite from the projection, the lower face and the inner side face define a first angle, the lower face and the outer side face define a second angle, and at least one of the first angle and the second angle is an acute angle.

20. The inductor component according to claim 2, wherein as seen in the first cross-section, the upper face of the projection has, in the direction parallel to the first major face, a width that is less than a width of a lowermost part of the projection in the direction parallel to the first major face.

* * * * *